(12) United States Patent (10) Patent No.: US 11,156,471 B2
Gil (45) Date of Patent: Oct. 26, 2021

(54) HANDS-FREE AUGMENTED REALITY SYSTEM FOR PICKING AND/OR SORTING ASSETS

(71) Applicant: United Parcel Service of America, Inc., Atlanta, GA (US)

(72) Inventor: Julio Gil, Veldhoven (NL)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 288 days.

(21) Appl. No.: 16/103,566

(22) Filed: Aug. 14, 2018

(65) Prior Publication Data

US 2019/0107411 A1 Apr. 11, 2019

Related U.S. Application Data

(60) Provisional application No. 62/545,752, filed on Aug. 15, 2017.

(51) Int. Cl.
*G01C 21/36* (2006.01)
*G06K 9/00* (2006.01)
(Continued)

(52) U.S. Cl.
CPC ....... *G01C 21/365* (2013.01); *G01C 21/3632* (2013.01); *G01C 21/3641* (2013.01);
(Continued)

(58) Field of Classification Search
CPC .............. G01C 21/365; G01C 21/3632; G01C 21/3641; G09G 3/001; G09G 2354/00;
(Continued)

(56) References Cited

U.S. PATENT DOCUMENTS 5,311,335 A 5/1994 Crabtree
7,624,024 B2 11/2009 Levis et al.
(Continued)

OTHER PUBLICATIONS

International Search Report and Written Opinion received for PCT Patent Application No. PCT/US18/00143, dated Dec. 4, 2018, 11 pages.
(Continued)

*Primary Examiner* — Jaime Figueroa
(74) *Attorney, Agent, or Firm* — Shook, Hardy & Bacon L.L.P.

(57) ABSTRACT

A system is provided for hands-free handling of at least one asset by a user. The system includes a user device configured to be worn by a user and a control system remotely located relative to the user device and configured to exchange asset-related data with the user device, the asset-related data including at least one or more notifications related to the handling of the at least one asset by the user at the asset location. The user device contains a processor configured to determine location data associated with the at least one asset and including a location for the at least one asset, the determination being based, in part, upon the obtained asset identifier data; dynamically generate and display, at the user device, one or more navigational projections configured to guide the user to the asset location; and detect handling of the at least one asset by the user.

10 Claims, 17 Drawing Sheets

(51) Int. Cl.
*G09G 3/00* (2006.01)
*G06F 3/147* (2006.01)
*G06F 1/16* (2006.01)
*G06Q 10/04* (2012.01)
*G06Q 10/08* (2012.01)
*G06T 19/00* (2011.01)

(52) U.S. Cl.
CPC .............. *G06F 1/163* (2013.01); *G06F 3/147* (2013.01); *G06K 9/00671* (2013.01); *G06Q 10/047* (2013.01); *G06Q 10/0833* (2013.01); *G06T 19/006* (2013.01); *G09G 3/001* (2013.01); *G09G 2354/00* (2013.01)

(58) Field of Classification Search
CPC ..... G06F 3/147; G06F 1/163; G06K 9/00671; G06Q 10/047; G06Q 10/0833; G06T 19/006
USPC ..................................................... 701/1, 432
See application file for complete search history.

(56) References Cited

U.S. PATENT DOCUMENTS

| | | | |
|---|---|---|---|
| 8,423,431 | B1 | 4/2013 | Rouaix et al. |
| 9,171,278 | B1 | 10/2015 | Kong et al. |
| 9,367,973 | B2* | 6/2016 | McGinnis ............... G07C 5/008 |
| 9,632,313 | B1 | 4/2017 | Madan et al. |
| 9,645,482 | B2 | 5/2017 | Joseph |
| 9,697,548 | B1 | 7/2017 | Jaff et al. |
| 9,911,290 | B1* | 3/2018 | Zalewski ............... G06Q 20/327 |
| 10,394,843 | B2* | 8/2019 | Lee .......................... G06F 16/27 |
| 10,535,169 | B2* | 1/2020 | Dotterweich ........ G06K 7/1417 |
| 2002/0010661 | A1 | 1/2002 | Waddington et al. |
| 2002/0120475 | A1 | 8/2002 | Morimoto |
| 2003/0179218 | A1 | 9/2003 | Martins et al. |
| 2004/0051680 | A1 | 3/2004 | Azuma et al. |
| 2005/0275831 | A1 | 12/2005 | Silver |
| 2011/0164163 | A1 | 7/2011 | Bilbrey et al. |
| 2012/0230581 | A1 | 9/2012 | Miyashita et al. |
| 2013/0069985 | A1 | 3/2013 | Wong et al. |
| 2013/0233922 | A1 | 9/2013 | Schoening et al. |
| 2013/0278631 | A1* | 10/2013 | Border ................... G02C 5/143 345/633 |
| 2014/0225916 | A1 | 8/2014 | Theimer et al. |
| 2014/0258052 | A1 | 9/2014 | Khuti et al. |
| 2015/0290795 | A1* | 10/2015 | Oleynik ................. B25J 9/0081 700/257 |
| 2015/0309316 | A1* | 10/2015 | Osterhout ............... G06F 1/163 345/8 |
| 2016/0019497 | A1 | 1/2016 | Carvajal |
| 2016/0371553 | A1 | 12/2016 | Farnham et al. |
| 2017/0039511 | A1* | 2/2017 | Corona ................... F25D 29/00 |
| 2017/0069135 | A1* | 3/2017 | Komaki ............. G06K 9/00536 |
| 2017/0108577 | A1 | 4/2017 | Loverich et al. |
| 2017/0124396 | A1* | 5/2017 | Todeschini ......... G06K 9/00671 |
| 2017/0140329 | A1 | 5/2017 | Bernhardt et al. |
| 2017/0200217 | A1* | 7/2017 | Huseth ................... G01C 21/00 |
| 2017/0249745 | A1* | 8/2017 | Fiala ....................... A63F 13/25 |
| 2017/0323376 | A1* | 11/2017 | Glaser ................. G06Q 20/203 |
| 2018/0068266 | A1 | 3/2018 | Kirmani et al. |
| 2018/0122118 | A1 | 5/2018 | Dotterweich et al. |
| 2018/0122119 | A1 | 5/2018 | Dotterweich et al. |
| 2018/0350093 | A1* | 12/2018 | Sweet ........................ G06T 7/74 |
| 2018/0373327 | A1* | 12/2018 | Todeschini ......... G02B 27/0093 |
| 2020/0111246 | A1 | 4/2020 | Dotterweich et al. |

OTHER PUBLICATIONS

Non-Final Office Action received for U.S. Appl. No. 15/798,664, dated Feb. 1, 2019, 10 pages.
Final Office Action received for U.S. Appl. No. 15/798,551, dated Apr. 29, 2019, 17 pages.
Notice of Allowance received for U.S. Appl. No. 15/798,551, dated Sep. 11, 2019, 13 pages.
Funk et al., "Pick from Here!—An Interactive Mobile Cart using In-Situ Projection for Order Picking", UbiComp 2015, Sep. 7-11, 2015, 9 pages.
Funk et al., "Mobile In-Situ Pick by Vision: Order Picking Support using a Projector Helmet", PETRA, Jun. 29-Jul. 1, 2016, 4 pages.
Li et al., "Evaluation of a Mobile Projector-Based Indoor Navigation Interface", Interacting with Computers, vol. 26, No. 6, 2014, 19 pages.
McFarlane et al., "Interactive Dirt: Increasing Mobile Work Performance with a Wearable Projector-Camera System", UbiComp 2009, Sep. 30-Oct. 3, 2009, pp. 205-214.
Mistry et al., "WUW—Wear ur world—A wearable gestural interface", Proceedings of the 27th International Conference Extended Abstracts on Human Factors in Computing Systems, Apr. 4-9, 2009, 7 pages.
Ota et al., "A Method for Wearable Projector Selection that Considers the Viewability of Projected Images", ACM Computers in Entertainment, Article 17, vol. 8, No. 3, Dec. 2010, 16 pages.
Sakata et al., "Visual Assist with a Laser Pointer and Wearable Display for Remote Collaboration", In Proceedings of 2nd International Conference on Collaboration Technologies, 2006, pp. 66-71.
Non-Final Office Action received for U.S. Appl. No. 15/798,551, dated Nov. 1, 2018, 15 Pages.
Preinterview first office action received for U.S. Appl. No. 16/707,134 dated Mar. 20, 2020, 4 pages.
Final Office Action received for U.S. Appl. No. 16/707,134, dated Mar. 29, 2021, 25 pages.
Non-Final Office Action received for U.S. Appl. No. 16/226,180, dated Mar. 19, 2021, 16 pages.
Goodrich, Ryan, "Accelerometers: What They Are & How They Work", Live Science; Available online at: <https://www.livescience.com/40102-accelerometers.html>, Oct. 1, 2013, 3 pages.
Non-Final Office Action received for U.S. Appl. No. 16/707,134, dated Oct. 30, 2020, 24 pages.
Extended European Search Report received for European Patent Application No. 18846205.5, dated Apr. 26, 2021, 8 pages.
Final Office Action received for U.S. Appl. No. 16/226,180, dated Sep. 9, 2021, 20 pages.

* cited by examiner

HANDS-FREE AUGMENTED REALITY SYSTEM FOR PICKING AND/OR SORTING ASSETS

CROSS-REFERENCE TO RELATED APPLICATIONS

This application claims priority to U.S. Provisional Patent Application No. 62/545,752 entitled "HANDS-FREE AUGMENTED REALITY SYSTEM FOR PICKING AND/OR SORTING ASSETS AND METHODS OF UTILIZING THE SAME," filed Aug. 15, 2017 which is incorporated herein by reference in its entirety.

BACKGROUND

The automated handling of parcels (e.g., packages, containers, letters, items, pallets, etc.) transported by common carriers through transportation networks is a complex problem with many parts. No single system or method alone appears to provide a comprehensive solution for all conditions. A primary component in some systems and methods for automated handling of packages is a conveyance device (i.e., a conveyor belt), which is generally formed and/or extended around at least two driving wheels. Thus, by turning the driving wheels, the conveyor belt may run continuously. Conveyor belts may also generally be flexible and deformable at least while running in contact with the driving wheels, and a multitude of materials, linkages, and so forth have been used to achieve these goals.

Where automated handling of packages has been implemented, certain inefficiencies may arise. For example, where packages may be improperly or too closely placed relative to one another on a conveyor belt, congestion may arise, impacting various measurements or the like that need to be performed on the packages while on the conveyor belt. Still further, where the materials in which packages are wrapped (e.g., foil or paper or the like) differ in color or other material characteristics, inaccuracies may also arise in any measurements, imaging, or observations made in an automated fashion relative to the packages or assets.

Beyond interactions with conveyor belts, automated handling of parcels creates additional challenges related to how the parcels—referred to elsewhere herein as assets—are transported and/or handled by carrier personnel between conveyor belts (and the like) and respective inventory locations (e.g., for picking) and/or sort locations (e.g., for sorting) associated with the assets.

In this context, a need exists for improved technological systems, assemblies, and/or methods for maintaining accurate records of the location of an asset in a sort and/or pick process, while also providing to carrier personnel improved instructions and/or guidance for the automated handling of the packages within various environments (e.g., a warehouse environment whether relative to a sort location, a pick location, a conveyor belt, and/or any combination thereof).

BRIEF SUMMARY

According to various embodiments described herein, a system is provided for hands-free handling of at least one asset by a user. The system can include a user device configured to be worn by a user. The user device may include one or more memories and one or more processors configured to perform the following operations. Asset identifier data can be obtained for at least one asset. Location data, associated with a location for the at least one asset, can be determined based, at least in part, upon the obtained asset identifier data. One or more navigational projections configured to guide the user to the location can be dynamically generated and displayed. Handling of the at least one asset by the user can be detected. One or more notifications associated with the handling of the at least one asset by the user at the location may be received.

In another embodiment, a computer implemented method is provided for hands-free handling of at least one asset by a user is provided. The method may include the following operations. Asset identifier data for at least one asset can be received from a remote location relative to a user device that is worn by the user. First location data associated with the user device can be determined at the user device. Second location data associated with the at least one asset may be determined. The second location data may be determined, based at least in part, on analyzing the received asset identifier data. The first location data may be determined, based at least in part, on analyzing a present position of the user device. One or more navigational projections configured to guide the user to a location associated with the second location data may be dynamically generated and displayed. The one or more navigational projections may be dynamically updated based at least in part on one or more detected changes of a present location of the user device.

In yet another embodiment, a computer program product is provided for hands-free handling of at least one asset by a user. The computer program product may include at least one non-transitory computer-readable storage medium having computer-readable program code portions stored therein. The computer-readable program code portions may include one or more executable portions configured for performing the following operations. An environment that a user is located in can be mapped based at least in part on generating a multidimensional graphical representation of the environment. Asset identifier data to identify at least one asset can be received at a user device. One or more assets locations can be associated within the mapped environment. The one or more asset locations may be associated with the at least one asset. One or more navigational projections configured to guide the user to an asset location within the environment may be generated and displayed based at least on the associating and within the environment that the user is in.

Additional details are provided in the accompanying Appendix, which include a visual presentation regarding various features of the embodiments described herein.

BRIEF DESCRIPTION OF THE SEVERAL VIEWS OF THE DRAWING(S)

FIG. 1 schematically depicts a control system according to one or more embodiments shown and described herein;

FIG. 2 schematically depicts a control system according to one or more embodiments shown and described herein;

FIG. 3 schematically depicts a user device that communicates with a control system of according to one or more embodiments shown and described herein;

Figure 6:
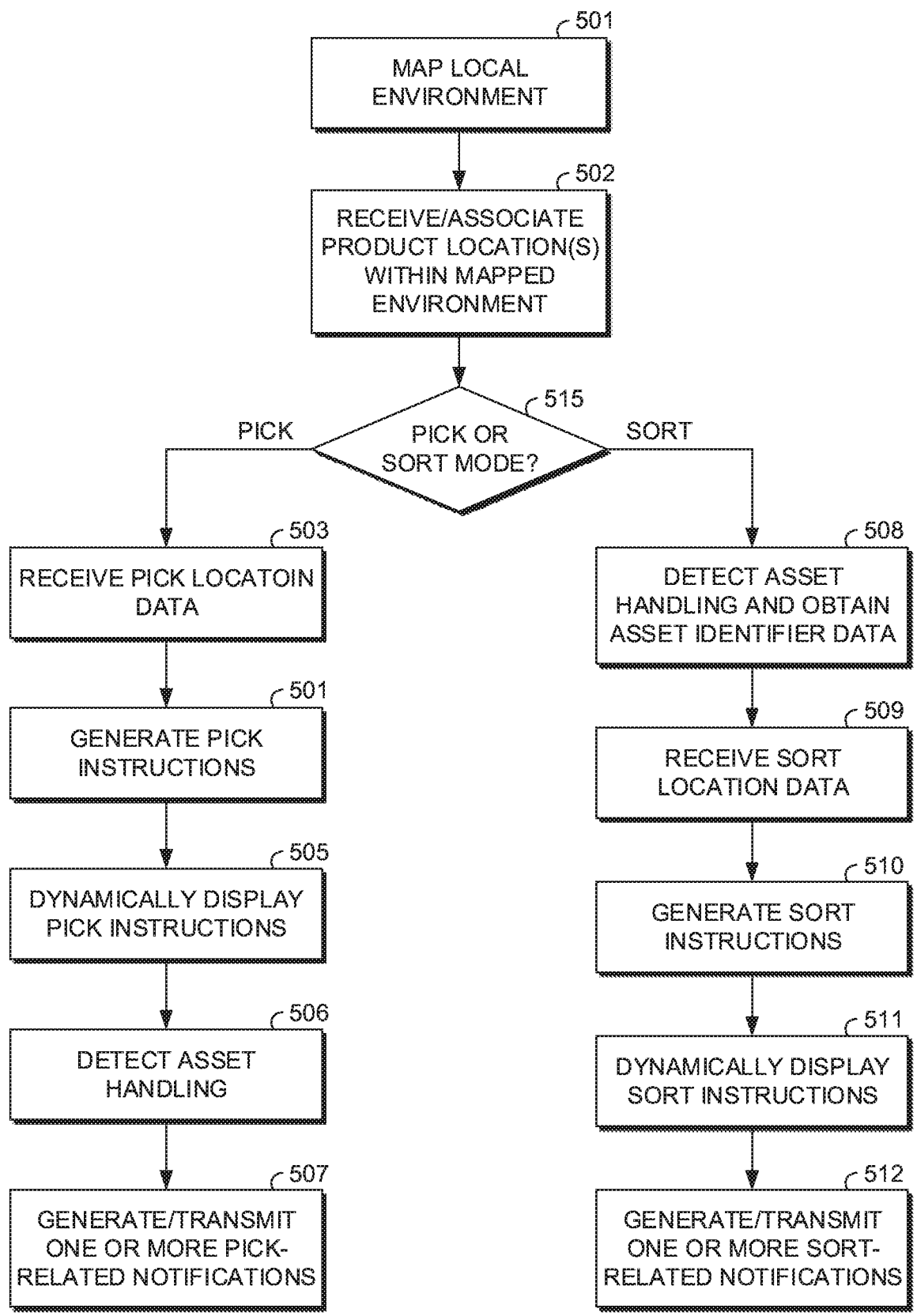
Figure 7:
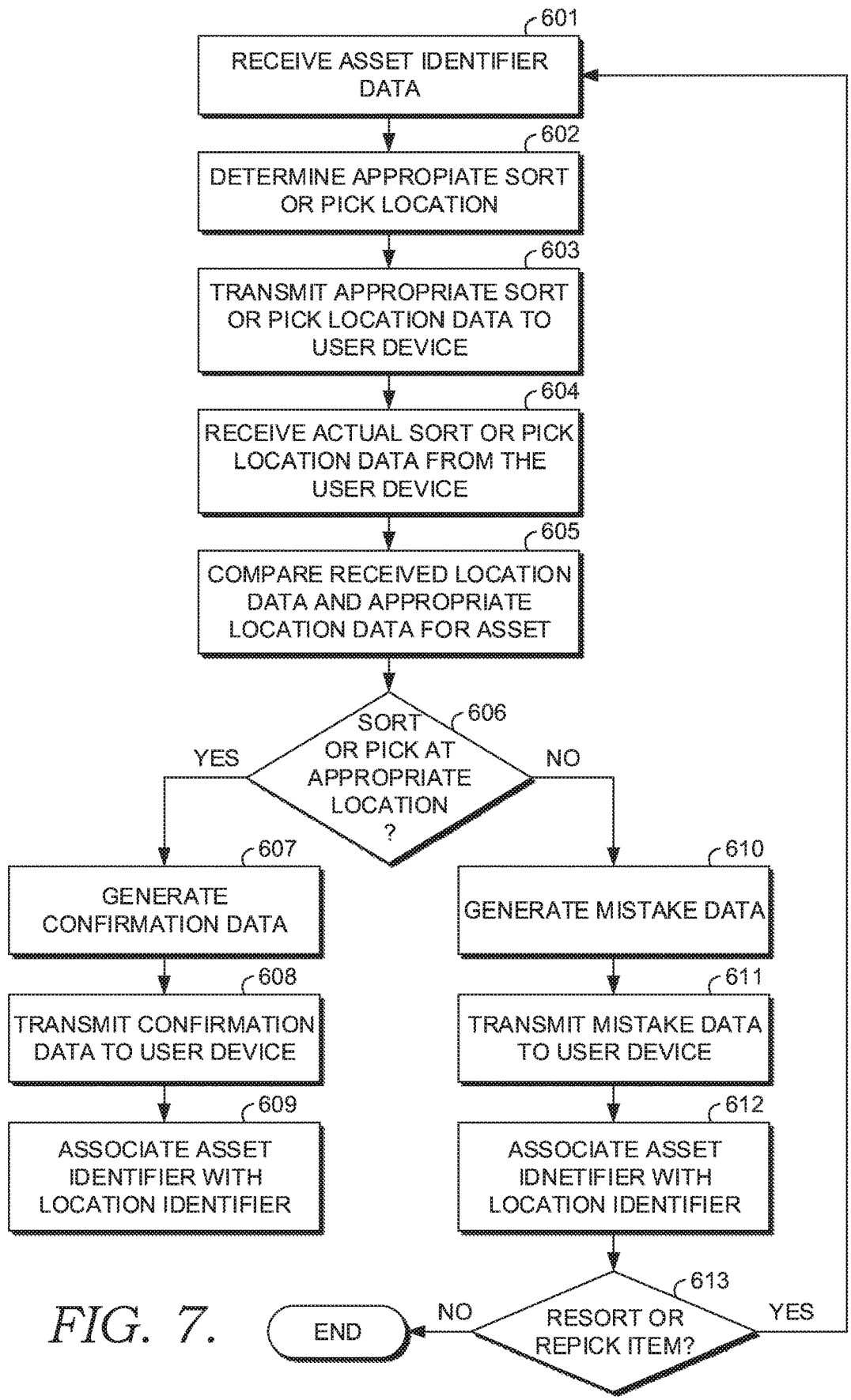
Figure 8:
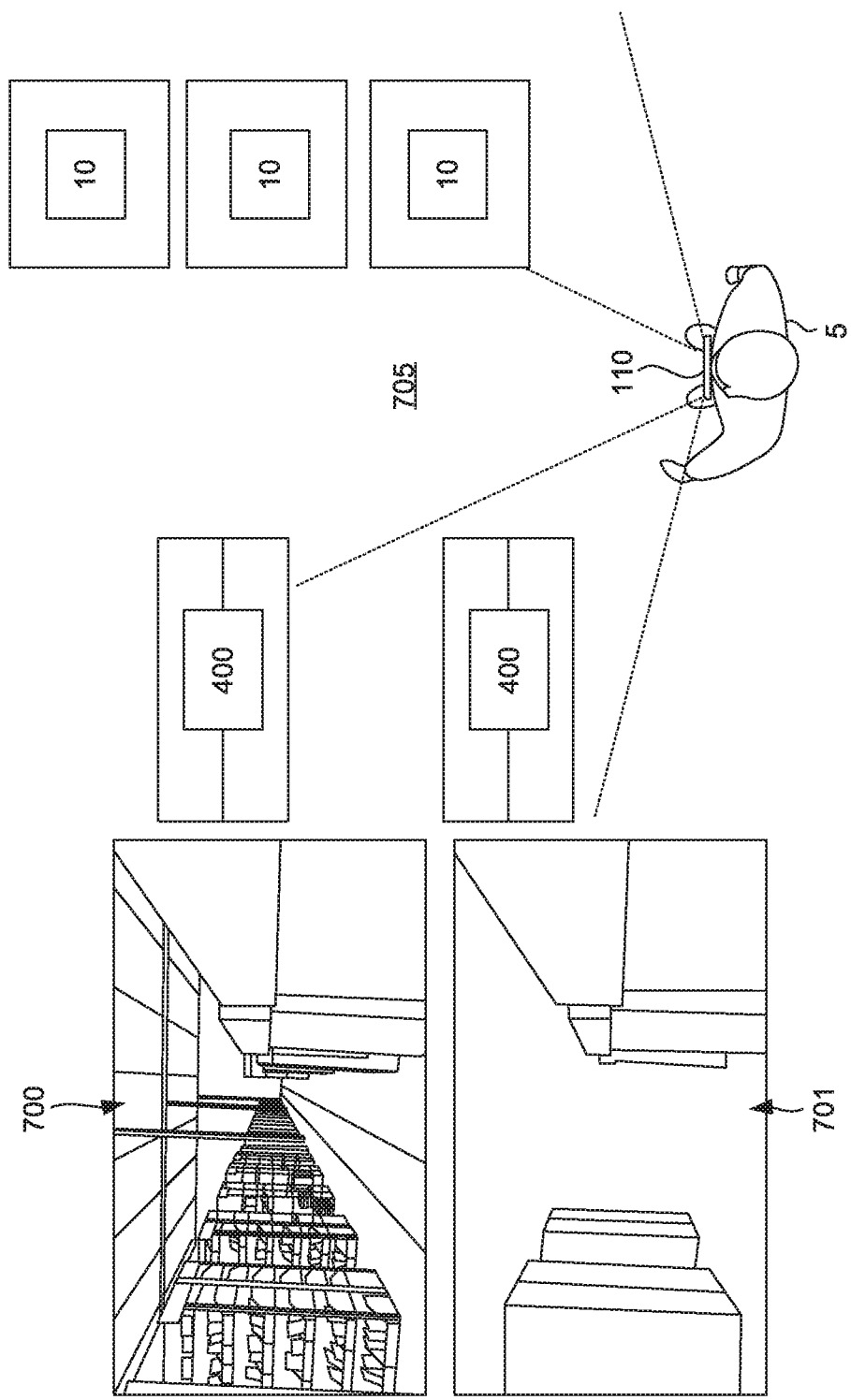
Figure 9:
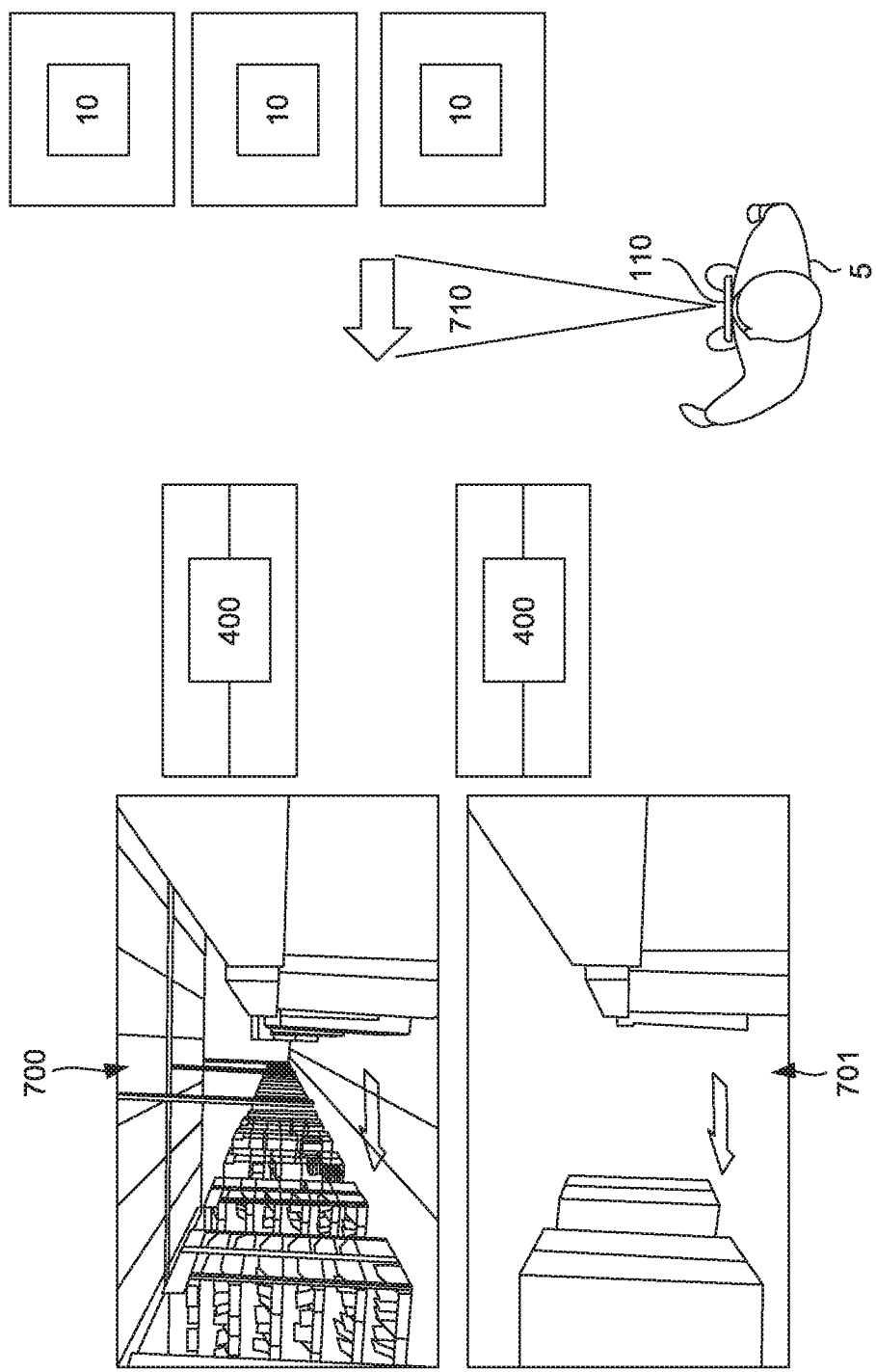
Figure 10:
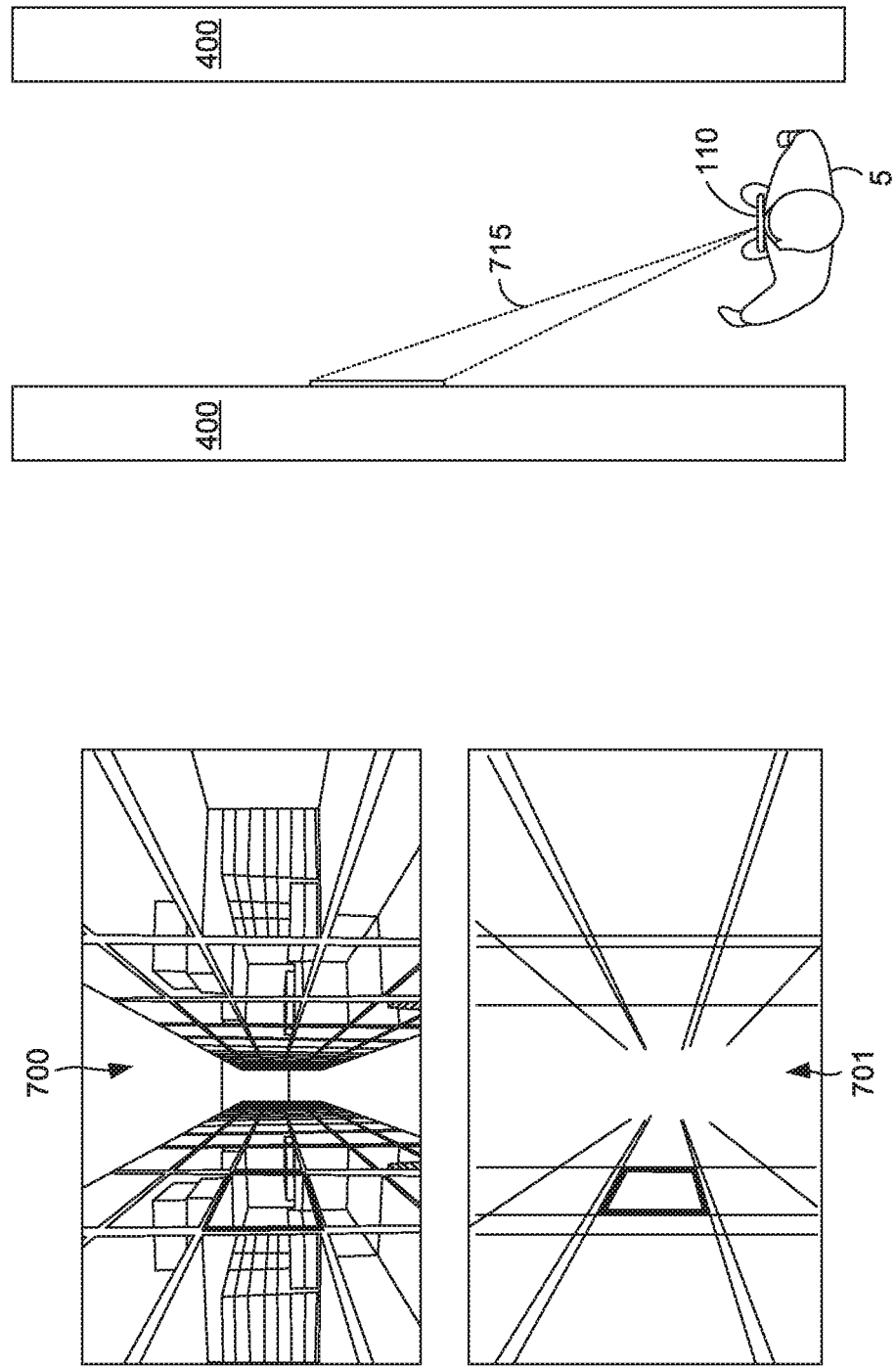
Figure 11A:
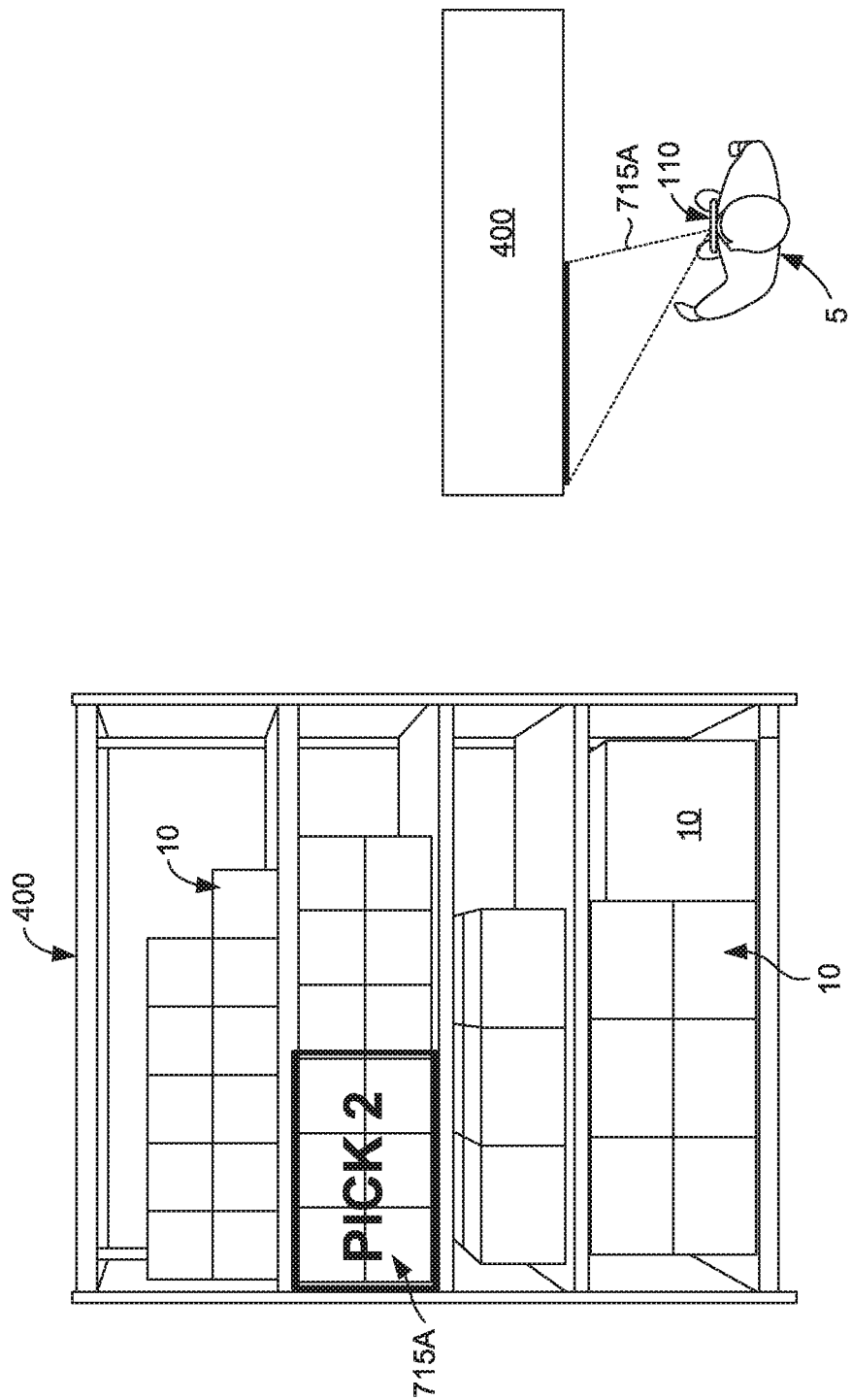
Figure 11B:
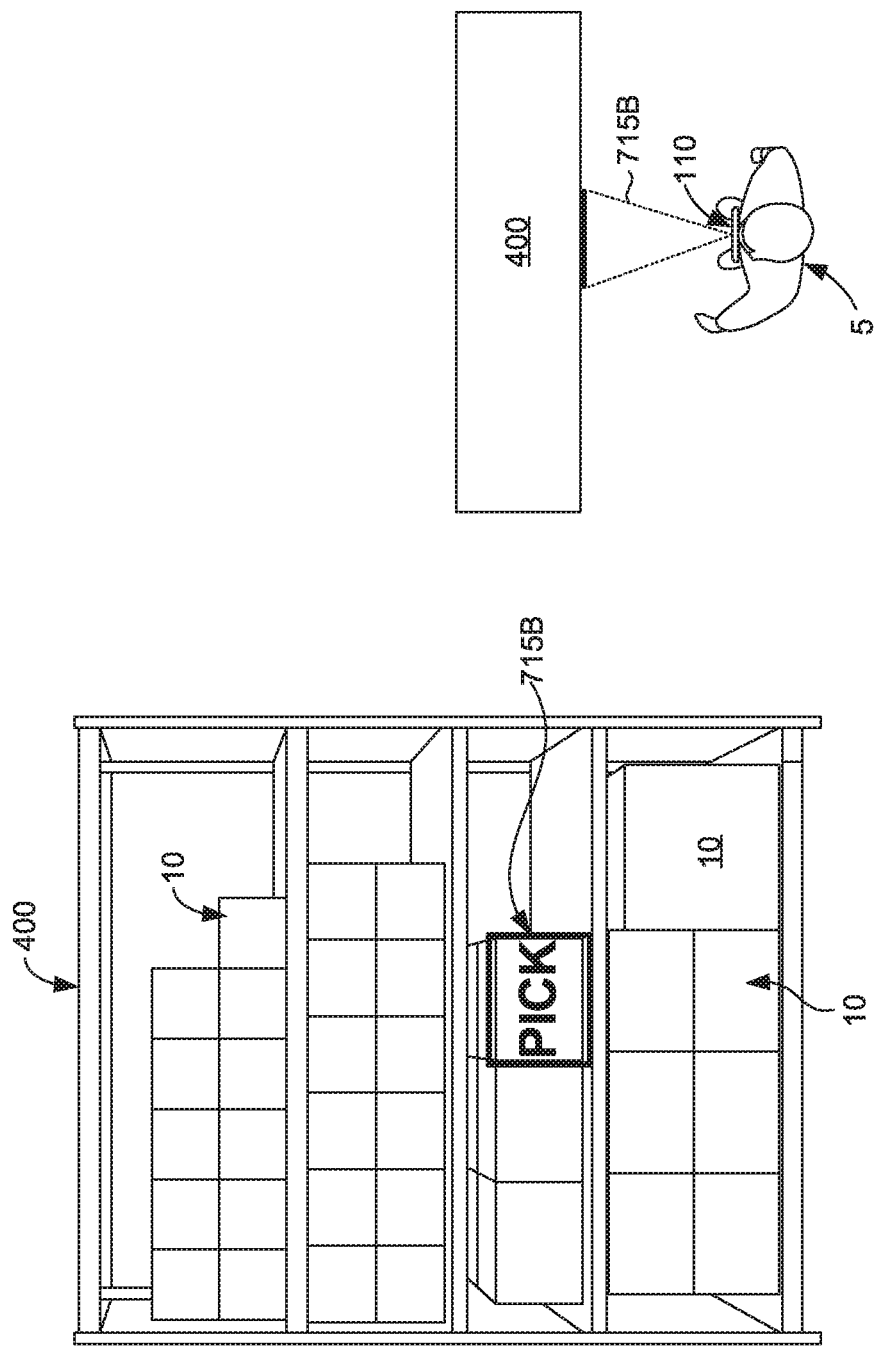
Figure 11C:
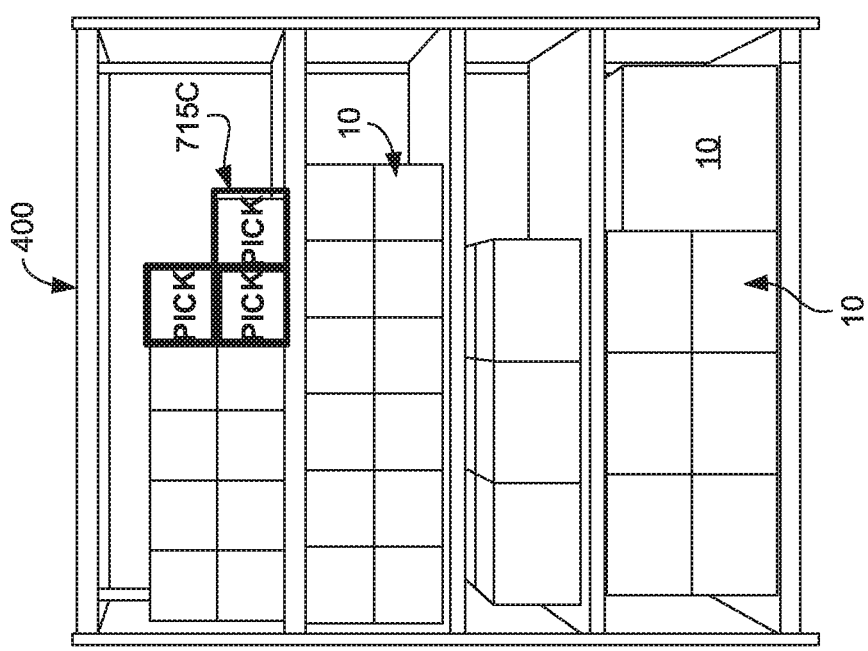
Figure 12:
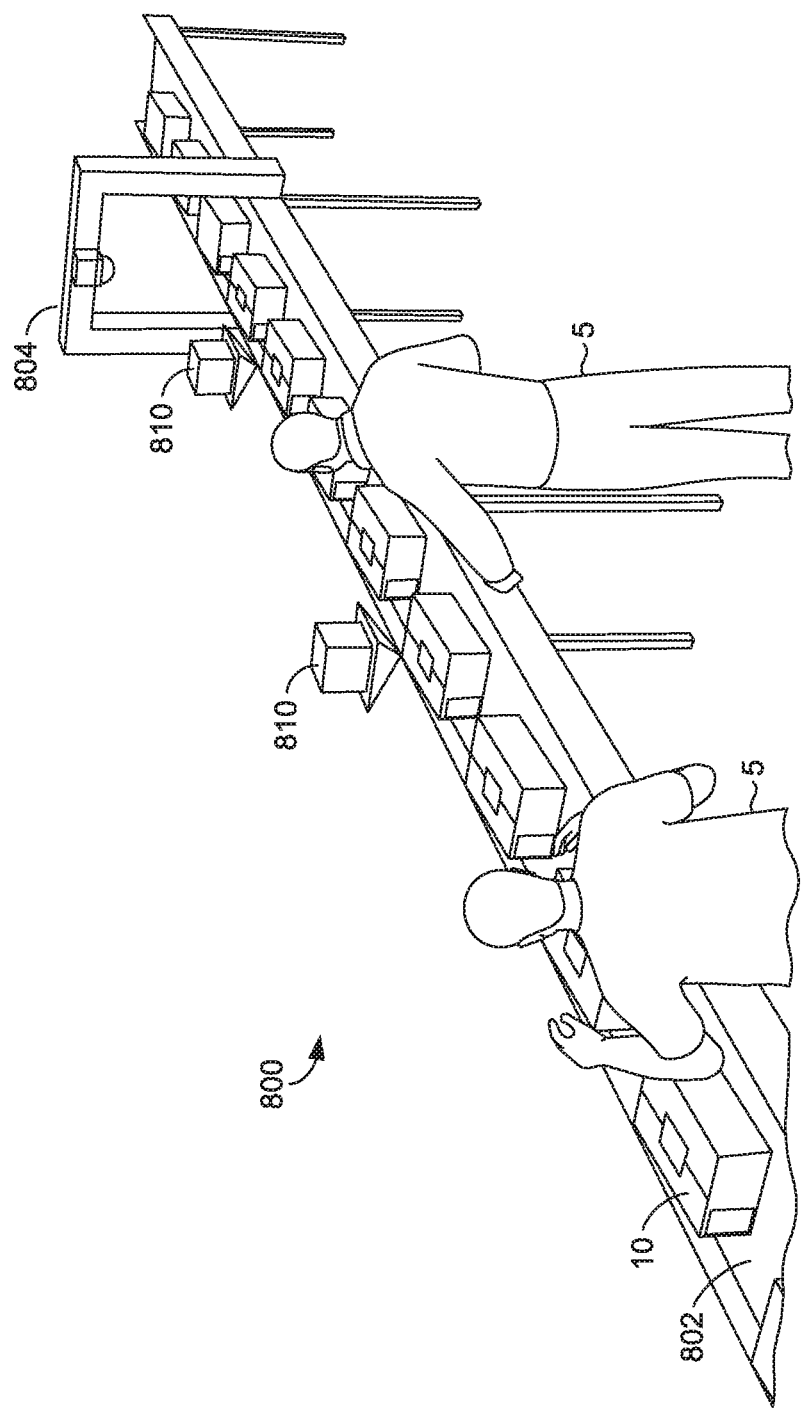

FIG. 6 schematically depicts a flowchart illustrating operations and processes performed by a user device according to one or more embodiments shown and described herein;

FIG. 7 schematically depicts a flowchart illustrating operations and processes performed according to one or more embodiments shown and described herein;

FIG. 8 depicts a facility and an environmental mapping procedure achieved via a user device according to one or more embodiments shown and described herein;

FIG. 9 depicts a facility and a pathway indicating navigational projection achieved via a user device according to one or more embodiments shown and described herein;

FIG. 10 depicts a shelving containing portion of a facility and a placement indicating navigational projection achieved via a user device according to one or more embodiments shown and described herein;

FIGS. 11A-C depict further views of three exemplary embodiments of the placement indicating navigational projection achieved via a user device according to one or more embodiments shown and described herein;

FIG. 12 is a perspective or isometric view of a conveyor belt assembly that may be utilized in conjunction with the control system and user device according to one or more embodiments shown and described herein;

FIGS. 13A-13F depict further views of additional exemplary navigational projections achieved via a user device and in conjunction with a conveyor belt assembly according to one or more embodiments shown and described herein;

DETAILED DESCRIPTION OF VARIOUS EMBODIMENTS

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. OVERVIEW

Existing asset handling technologies remain burdensome and are not suitable for all tasks. For example, augmented reality-based computing solutions have been pursued, such as with reference to U.S. Ser. No. 15/581,609, the contents of which as are incorporated by reference herein in their entirety. These augmented-reality-based solutions can utilize objects, such as smart glasses, to generate an environment so as to provide to carrier personnel (e.g., via a lens of the smart glasses) directions for transporting particular assets or packages. However, smart glasses may be uncomfortable to use for long periods of time (e.g., due to the weight and constant pressure) and these glasses reduce the peripheral vision for instructions needed for users or reduce vision in general due to glare on the lenses, which may impact both safety and job accuracy. Existing technology solutions also fail to have more robust functionality to meet the needs of multiple users for various tasks. Further, some existing asset handling technologies are based on static projection methods that are also burdensome. For example, some solutions require users to move around a large projector cart or wagon mounted with a generic projector to guide users to destinations.

Various embodiments of the present disclosure improve these existing technologies, such as smart glasses, by at least utilizing a hands-free user device(s), a control system or server in networked communication with the hands-free user device(s), and/or a generated augmented reality environment to facilitate handling and transport of an asset or package by carrier personnel or the like. The handling and/or transport of the asset or package may be related to a picking of the asset from a pick location (e.g., to "pull" the asset to fulfill an order thereof by a customer), the sorting of the asset to a sort location (e.g., from a conveyor belt or the like to the next location in which transport or handling of the asset may occur, for example, on the shelving of a warehouse or a vehicle). The hands-free user device(s) enables carrier personnel to transport and/or handle the asset or package in a safe, ergonomic, efficient, and accurate matter, regardless of where (e.g., to and from) the handling and/or transport is occurring, at least within a three dimensional environment mapped via the hands-free user device(s).

In an illustrative example of how these existing technologies are improved according to aspects of the present disclosure, a user device can be worn by a user, such as on a wearable article of clothing, as opposed to placing eyewear over a user's eyes or using a mobile or cart device for the handling of assets. After one or more asset identifiers are obtained and location data is determined for an asset, one or more navigational projections can be dynamically generated and displayed (e.g., within a physical environment a user is in, as opposed to a lens medium) to guide the user to the location associated with the location data. Aspects can also detect handling of the asset by the user (e.g., via cameras, sensors). One or more notifications associated with the detection of the handling can be received (e.g., from a control system). Location data can be determined based on analyzing asset identifier data and analyzing a present position of the user device. Further, a user's environment may be mapped based at least on generating a multidimensional graphical representation of the environment and associating one or more asset locations within the mapped environment. At least each of these new functionalities improve existing technologies, as these are functionalities that various existing technologies do not now employ.

Conventional methods in the shipping and other industries rely upon carrier personnel manually reading and/or scanning asset identifier data associated with the asset or package and then based thereon manually transporting the package or asset to the proper location. A pick or inventory location code or identifier and/or a sort location code or identifier could then also—in some instances—be read or scanned to confirm transport was correctly completed. Inefficiencies and inaccuracies are oftentimes encountered.

To address these inefficiencies and inaccuracies of the conventional methods, various non-conventional methods have been employed in the present disclosure. For example, such non-conventional methods include the following operations: obtaining one or more asset identifiers determining location data for the associated asset(s). Navigational projections can be dynamically generated and displayed (e.g., within a physical environment a user is in, as opposed to a lens medium) to guide the user to the location associated with the location data. Aspects can also detect handling of the asset by the user (e.g., via cameras, sensors). One or more notifications associated with the handling can be received (e.g., from a control system). Location data can be determined based on analyzing asset identifier data and analyzing a present position of the user device. Further, a user's environment may be mapped based at least on generating a multidimensional graphical representation of the environment and associating one or more asset locations within the mapped environment. At least each of these new functionalities include non-conventional functions.

As used herein, an asset may be a parcel or group of parcels, a package or group of packages, a box, a crate, a drum, a box strapped to a pallet, and/or the like. According to standard practices, packages to be sorted may be moved along a conveyor belt from some package source to an intake location (e.g., one or more sort employee workstations). A user (e.g., a sort employee or carrier personnel generally) may scan a bar code on the package, or simply reviews information printed on the package, and moves that package to an appropriate sort location (e.g., a vehicle, a shelf, and/or the like) based on the information provided on the package or via the barcode scanner. As described herein, embodiments utilizing a conveyor belt assembly may rely upon an acquisition device (e.g., a stationary imager) positioned above the conveyor, upstream of the intake location or sort employee workstations to capture data associated with the package. Additional details in this respect may be understood with reference to U.S. Ser. No. 15/581,609, the contents of which as are incorporated by reference herein in their entirety.

Via the hands-free user device(s), the carrier personnel or sort employee may be guided to particular packages to select for transport. Upon the carrier personnel or sort employee picking up the particular packages they are guided to, the hands-free user device(s) may be configured, according to various embodiments, to generate various projections, visible to the carrier personnel or sort employee. The generated projections, which may be three-dimensional or two-dimensional in form, are configured to guide the carrier personnel or sort employee from their current location to the appropriate sort location for the particular package being handled. Upon arrival—via the guidance of the various projections—at the appropriate sort location, the hands-free user device(s), upon detecting a placement of the particular package may further verify that the placement is correct. If incorrect, notification(s) may be generated, which notifications may take multiple forms, as detailed elsewhere herein.

In the context of picking, the control system may, via the network, interface with the hands-free user device(s) so as to generate one or more of various projections to guide the carrier personnel or pick employee to the location of a particular package that needs to be picked or "pulled" for order fulfillment from a warehouse location or the like. Upon arrival of the carrier personnel or pick employee at the pick location, specific projections may be generated, so as to advise the personnel or employee which specific package should be picked/pulled and/or how many packages (i.e., of the same type) should be picked/pulled. It should be understood that upon or in response to detection of the picking/pulling of the package(s) by the user device, the latter may be further configured to then guide the carrier personnel to a subsequent location for ongoing handling/transport of the package. Exemplary subsequent locations may include a conveyor belt and/or a sort location, as discussed above and also detailed elsewhere herein.

In certain embodiments, although not necessary via the three dimensional mapping of the facility or warehouse and the network interface between the user device(s) and the control system/server, the hands-free user device(s) may utilize software that not only detects changes in handling of the packages (e.g., picking up or placement actions), but that also detects various markers or identifiers distributed throughout the facility or warehouse, so as to ensure accuracy of the guidance and/or navigational instructions provided to the carrier personnel. In other embodiments, no such markers or identifiers may be provided, as the three dimensional mapping via the user device(s)—with network-ing connectivity to the control system/server—may be utilized to calibrate and establish defined locations (i.e., pick or sort) throughout the facility or warehouse prior to utilization of the hands-free user device(s) for operational purposes by the carrier personnel. In some embodiments, radio signal triangulation (RFID/WIFI), digital compass, and/or any other current method to determine indoor and outdoor position and bearing may be utilized.

II. COMPUTER PROGRAM PRODUCTS, METHODS, AND COMPUTING ENTITIES

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

Figure 1:
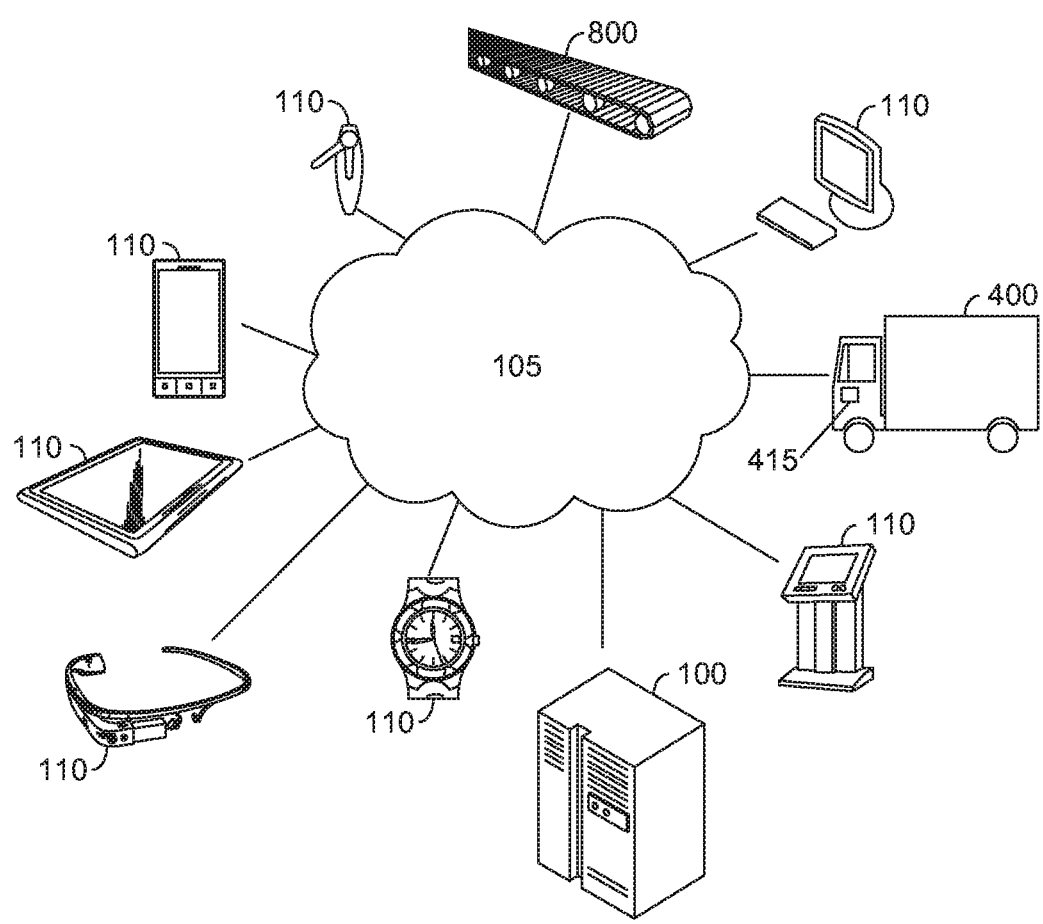

Generally, embodiments of the present disclosure relate to concepts for utilizing a hands-free user device(s), a control system or server in networked communication with the hands-free user device(s), and a generated augmented reality environment to facilitate handling and transport of an asset or package by carrier personnel or the like. FIG. 1 is a schematic diagram showing the exemplary communication relationships between components of various embodiments of the present disclosure. As shown in FIG. 1, the system may include one or more control systems 100, one or more user devices 110, one or more (optionally) location devices 415 associated with a location 400 (e.g., a sort location or a pick location), one or more (optionally) conveyor belt assemblies 800, and one or more networks 105. Each of the components of the system may be in electronic communication with one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

A. Exemplary Control System

Figure 2:
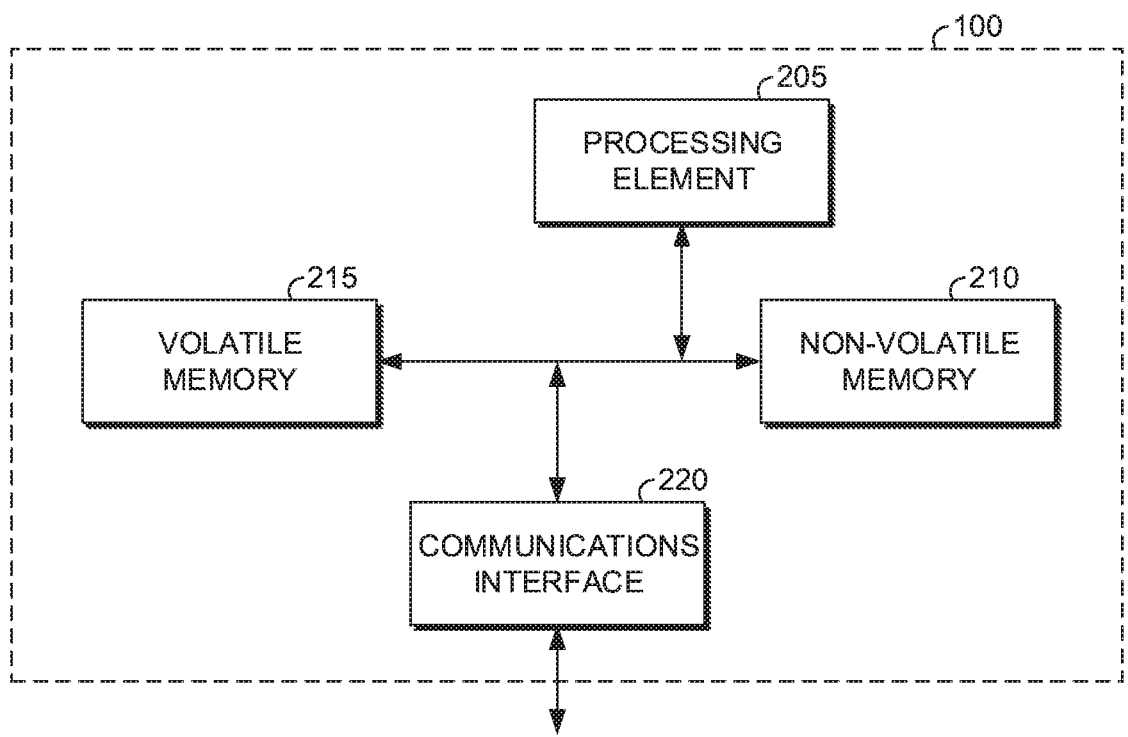

FIG. 2 provides a schematic of a control system 100 according to one embodiment of the present disclosure. As described above, the control system 100 may be incorporated into a system as one or more components for providing information regarding the appropriate location 400 for each of one or more assets 10 (see FIGS. 8-12). In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. The control system 100 may also comprise various other systems, such as an Address Matching System (AMS), an Internet Membership System (IMS), a Customer Profile System (CPS), a Package Center Information System (PCIS), a Customized Pickup and Delivery System (CPAD), a Web Content Management System (WCMS), a Notification Email System (NES), a Fraud Prevention System (FPS), and a variety of other systems and their corresponding components.

As indicated, in one embodiment, the control system 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the control system 100 may include or be in communication with one or more processing elements 205 (also referred to as processors, processing circuitry, and/or similar terms used herein interchangeably) that communicate with other elements within the control system 100 via a bus, for example. As will be understood, the processing element 205 may be embodied in a number of different ways. For example, the processing element 205 may be embodied as one or more complex programmable logic devices (CPLDs), microprocessors, multi-core processors, co-processing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the control system 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. Such code may include an operating system, an acquisition module, a sort location module, a matching module, and a notification module. The terms database, database instance, database management system, and/or similar terms used herein interchangeably may refer to a structured collection of records or data that is stored in a computer-readable storage medium, such as via a relational database, hierarchical database, and/or network database.

In one embodiment, the control system 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the control system 100 with the assistance of the processing element 205 and operating system.

As indicated, in one embodiment, the control system 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the control system 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra-wideband (UWB), infrared (IR) protocols, near field communication (NFC) protocols, Bluetooth™ protocols (e.g., Bluetooth™ Smart), wireless universal serial bus (USB) protocols, and/or any other wireless protocol.

The control system 100 may include or be in communication with one or more input elements, such as a keyboard input, a mouse input, a touch screen/display input, motion input, movement input, audio input, pointing device input, joystick input, keypad input, and/or the like. The control system 100 may also include or be in communication with one or more output elements (not shown), such as audio output, video output, screen/display output, motion output, movement output, and/or the like.

As will be appreciated, one or more of the control system's 100 components may be located remotely from other control system 100 components, such as in a distributed system. Furthermore, one or more of the components may be combined and additional components performing functions described herein may be included in the control system 100. Thus, the control system 100 can be adapted to accommodate a variety of needs and circumstances. As will be recognized, these architectures and descriptions are provided for exemplary purposes only and are not limiting to the various embodiments. Additional details in this respect may be understood from U.S. Ser. No. 15/390,109, the contents of which as are incorporated herein by reference in their entirety.

As will also be appreciated, the control system 100 may be generally configured to maintain and/or update a defined location map associated with a facility or warehouse in which the user device(s) will be operated. This may be maintained for provision to the user device(s) upon calibration or initial "environment mapping" (see FIG. 8) via the user device(s); in other embodiments, the control system may maintain the defined location map—indicating where each package or asset should be located (whether for picking or sorting)—as a fail-safe check or validation to be assessed against the environment mapping conducted via and at the user device(s). In these embodiments, location devices 415 (or identifier tags/codes/or the like) may be provided at the respective locations, for scanning or recognition via the user device(s) during calibration and/or environment mapping. In at least one preferred embodiment, however, the environment mapping occurs without need for or utilization of such location devices 415.

B. Exemplary User Device

Figure 3:
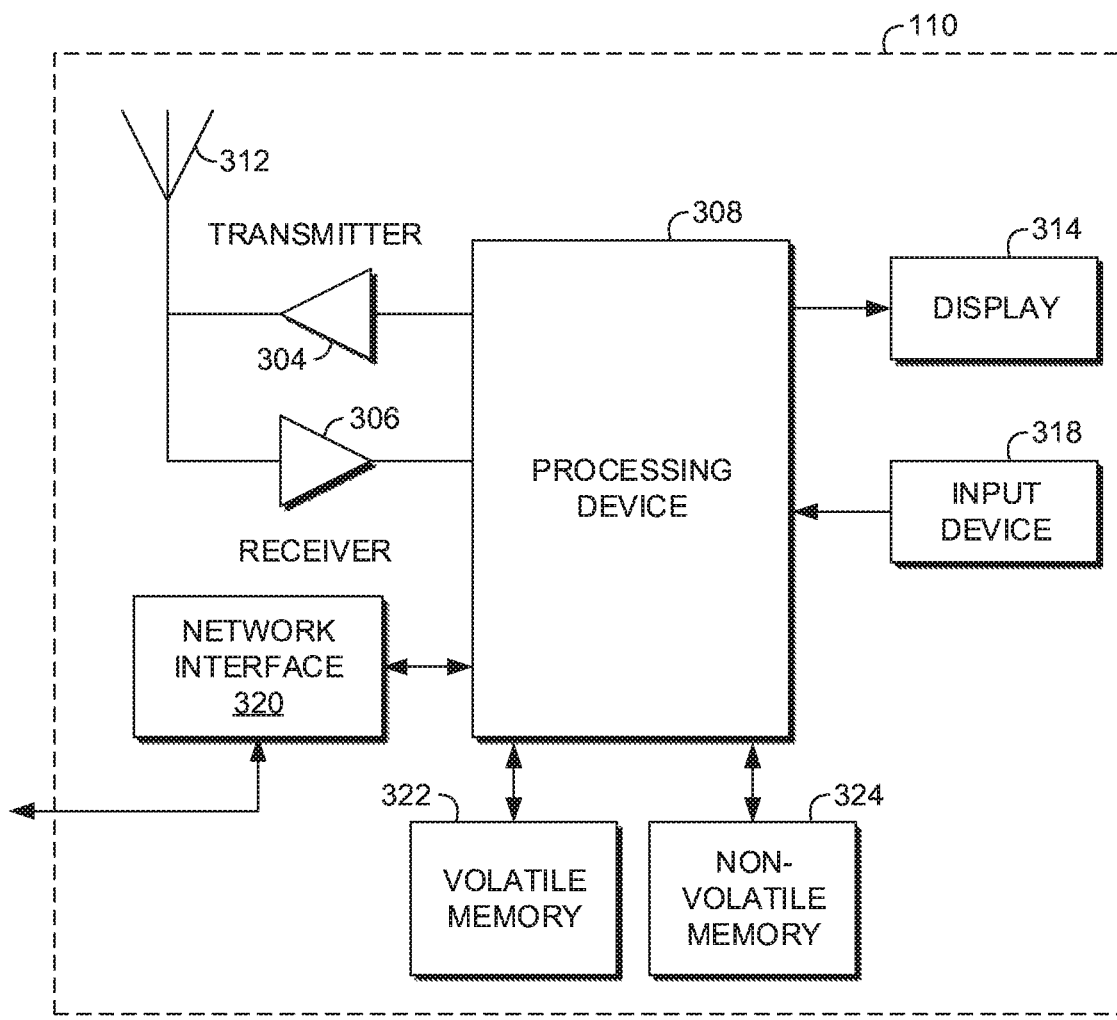

FIG. 3 depicts a user device 110 that a user 5 (e.g., user 5 of FIGS. 8-12) may operate. As used herein, a user may be an individual (e.g., carrier personnel, such as a sort employee, a pick employee, or the like), a group of individuals, and/or the like. In various embodiments, the user may operate the user device 110, which may include one or more components that are functionally similar to those of the control system 100. In one embodiment, the user device 110 may be one or more mobile phones, tablets, watches, glasses (e.g., Google Glass, HoloLens, Vuzix M-100, SeeThru, Optinvent ORA-S, Epson Moverio BT-300, Epson Moverio BT-2000, ODG R-7, binocular Smart Glasses, monocular Smart Glasses, and the like), wristbands, and the like, and/or any combination of devices or entities adapted to perform the functions, operations, and/or processes described herein. In particularly preferred embodiments herein the user device 110 is a hands-free type device, including wearable items/devices (e.g., the user devices of FIGS. 4-5), head-mounted displays (HMDs) (e.g., Oculus Rift, Sony HMZ-T3 W, and the like), and the like. It should be understood that, in at least these embodiments, the user device 110 is configured to not impede the user's range of vision and/or the like during the use thereof, as is possible in other embodiments wherein, for example, the user device 110 is a type of glasses or the like.

Figure 4:
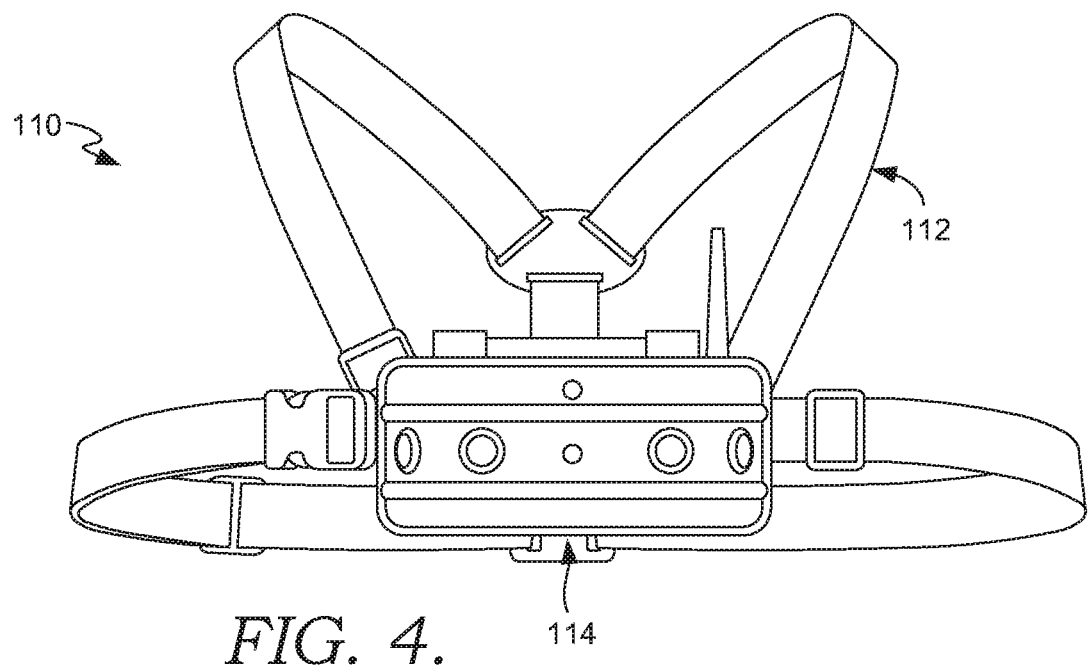
FIG. 4 depicts a user device in conjunction with a harness mechanism according to one or more embodiments shown and described herein.
Figure 5:
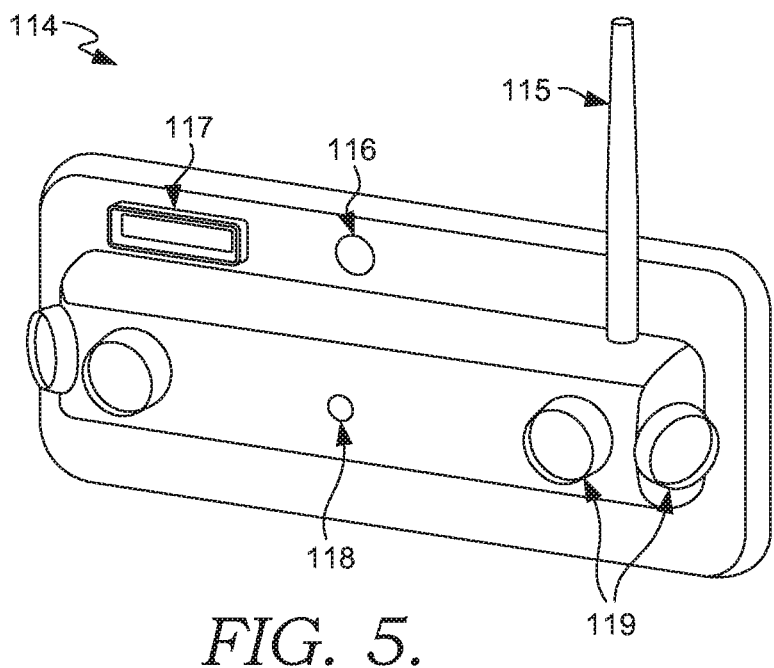
FIG. 5 depicts a user device in isolation without the harness mechanism according to one or more embodiments shown and described herein.

It should also be understood that the term user device 110 is intended to refer to any device that projects, superimposes, overlays, or otherwise provides an image or projection on a surface with respect to a user's viewing angle or line of vision or a user device 110's angle. With reference now to FIGS. 4 and 5, illustrated therein is an exemplary embodiment of a hands-free user device 110 according to various solutions described herein. The device 110 is configured for chest mounting via a mounting mechanism 112 in the illustrated embodiment. The mounting mechanism 112 may include a shoulder strap portion 112-1 configured to adjustably wrap around a user's anterior and posterior portion of the user's shoulders and a waist portion 112-2 configured to adjustably wrap around the user's waist. The shoulder strap portion 112-1 is connected to a top portion of the device component 114 at the anterior side and a top portion of the waist portion 112-2 at the posterior side. As discussed herein, it should be understood that the device 110 may come in any suitable form and be mounted in any suitable manner and in any suitable location. For example, in some embodiments, the user device 110 does not include the mounting mechanism 112 and may be mounted to a component: on the user's head (e.g., a hardhat), within a wristband, within a sock, within a glove, within a shirt, and/or within any other suitable article of clothing in any orientation. It may also be provided with a mounting mechanism (not illustrated) on a picking cart or a forklift or any type of component operated and/or being moved by the carrier personnel. In some embodiments, other mounts could place the device 110 on top of the head (e.g., via a helmet, cap or headband), or shoulder mounted. This, in order to avoid covering the projection element when carrying a parcel in front of the chest. In some embodiments, the projection element, the sensors and the processing units are mounted in different parts of the body to get a better weight distribution.

Remaining with FIGS. 4 and 5, the user device 110 in its hands-free form may include not only the mounting mechanism 112 but also a device component 114 that together define and constitute the user device 110 in some embodiments. Via the device component 114 (FIG. 5), the user device 110 in its hands-free form may include an antenna 115 (e.g., the antenna 312 of the user device of FIG. 3), a camera 116, a speaker/microphone 117, a pivoting laser projector 118 and two or more three-dimensional depth sensors 119. In this respect, it should more broadly be understood that the term user device 110 is intended to also include any other peripheral electronics and functionality that may be provided in conjunction with such devices. For example, the user device 110 may include speakers, headphones, or other electronic hardware for audio output, a plurality of display devices, one or more position sensors (e.g., gyroscopes, global positioning system receivers, and/or accelerometers), battery packs, beacons for external sensors (e.g., infrared lamps), or the like. In one embodiment, the user device 110 can be used to provide an augmented reality environment/area, a mixed reality environment/area, and/or similar words, as may be used herein interchangeably, to a user. The terms augmented/mixed environment/area should be understood to refer to a combined environment/area including the physical environment/area and elements of a virtual environment/area. In some embodiments, the pivoting laser projector 118 is alternatively an LED picoprojector.

In some embodiments, the device component 114 alternatively or additionally includes different sensors for various functions, such as one or more digital compasses, accelerometers and/or gyroscopes configured to determine changes in position or speed of a user such that the pivoting laser projector 118 projects the correct image in the correct orientation. For example, if the user is hanging in a sideways manner, an accelerometer can detect that the associated device component 114 is likewise oriented. This information can be identified by a processor, which causes the pivoting laser projector 118 to responsively transmit a projection in a sideways manner, as opposed to a manner associated with the user standing on his/her feet. In another example, the user can be running or otherwise moving at a particular speed, which causes the projector 118 to make projections faster/slower based on the speed or acceleration a user is moving at. Additionally or alternatively, these movement sensors can be used for notification purposes to the control system 100. For example, the accelerometer may infer that a person is in a particular orientation. These accelerometer readings may then be transmitted, via the antenna 115, to the control system 100 such that the control system 100 responsively transmits a notification back to the device component 114 in order to warn or notify the user whether the user is in a suitable orientation. Other sensors may be used alternatively or additionally, such as range finders to identify how far away the device component 114 is from obstacles (e.g. conveyor devices) within an environment. This may help the projected image be projected in a more precise three-dimensional manner. For example, referring to FIG. 12, the projection 810 may be projected in its specific orientation based at least on one or more range finders identifying the precise distance between a user device and the conveying mechanism 802. In another example, proximity-based sensors (e.g., RFID reader and tag) may be utilized within the user device and an object (e.g., an asset and/or conveying mechanism) in order to trigger the appropriate projections projected by the projector 118. For example, the device component 114 may include a tag reader that, when within a proximity or signal strength threshold of a tag located on an asset/object, triggers projections and/or notifications from the control system 100. In another example, assets or other pieces of equipment (e.g., a conveyance mechanism) includes one or more beacons configured to transmit location identifiers to any listening device within a threshold distance. In these embodiments, the listening device may be the device component 114, which receives the location identifiers and transmits them to the control system 100 such that the control system 100 provides responsive notifications back to the device component 114, such as "pick package Y from shelf X," etc. In some aspects, the device component 114 includes one or more location sensors (e.g., beacons, GPS modules) for the determining and analyzing location data as described herein.

Referring back to FIG. 3, the user device 110 can include an antenna 312 (e.g., the antenna 115 of FIG. 5), a transmitter 304 (e.g., radio), a receiver 306 (e.g., radio), and a processing element 308 (e.g., CPLDs, microprocessors, multi-core processors, co-processing entities, ASIPs, microcontrollers, and/or controllers) that provides signals to and receives signals from the transmitter 304 and receiver 306, respectively. Certain embodiments of the user device 110 may also include and/or be associated with any of a variety of sensors (e.g., three-dimensional sensors, such as the depth sensors 119 of FIG. 5), depth cameras (e.g., the camera 116 of FIG. 5), three-dimensional scanners, binocular cameras, stereo-vision systems, pivoting projectors (e.g., the laser projector 118 of FIG. 5).

In certain embodiments, the three-dimensional sensors (e.g., sensors 119 of FIG. 5) and/or the three-dimensional scanners may be utilized to "read" the environment surrounding the user device 110, as detailed elsewhere herein. In those and additional embodiments, the sensors and/or scanners may build therefrom a three-dimensional model of the area through which the device 110 travels and/or has travelled. This generated model, as detailed elsewhere herein, may then be compared by one or more processors within the device 110 to a memory-based map of the facility or area (i.e., the environment). By doing so, the scanner readings may be used to determine which area of the map is in front of a user of the user device 110 (during operation) and extrapolate from the same the position and heading of the user for future movement.

In certain embodiments, the pivoting projectors may be the pivoting laser projector 118 of FIG. 5; although, in other embodiments the projectors need not necessarily be laser-based. In various embodiments, it should be understood that the projectors are configured to generate and provide—in a manner visible to the user (e.g., the carrier personnel)—one or more navigational guidance projections (e.g., arrows, frames, text, and/or the like). These projections, as will be discussed in further detail elsewhere herein, may be two-dimensional representations (e.g., as illustrated in FIGS. 8-11C), three-dimensional representations (e.g., the projection 810 of FIG. 12), and/or holographic-based projections, or the like. The projections may be provided on a floor surface, a wall surface, and/or on or adjacent a shelving structure, as detailed elsewhere herein. Optionally, a separate sensor, a regular camera, or the like (e.g., the camera 116 of FIG. 5) may also be provided on the user device 110 for reading of the projected image(s) and therefrom verify if the projector is working properly and/or whether the result projected is readable. Via the user device 110 and software associated therewith, in conjunction with location determining capabilities of the system described herein generally, the projections provided via the user device are updated in real-time or near-real-time, as the user moves physically. A refresh rate in the range of 35-60 times per second may be provided, although differing rates of refreshing may be desirable, provided that the rate provided is substantially real-time or near real-time in nature.

Remaining with FIG. 5, the camera 116 of the user device component 114 illustrated therein in its hands-free form may be utilized as a fail-safe for visual confirmation or the like of correct/accurate handling of an asset or package by the user of the user device 110. For example, in some embodiments the camera 116 captures each asset identifier and/or asset location identifier as a user traverses an environment. This location data and asset identifier data may then be transmitted, in near-real time via the antenna 115, to the control system 100. The control system 100 may then compare the asset identifier to asset identifiers stored in a data store to identify an asset and do the same with the captured location. In this way, the control system 100 may identify any discrepancies between the asset and the location by locating any mismatches between identifiers. For example, the control system 100 may determine that the identifier associated with package X should be located, picked, and/or placed at shelf Y, but the camera 116 captured it located in, picked, sorted and/or placed at shelf B. A notification indicating this may be responsively transmitted back to the device 114 such that the speaker 117 issues a prompt indicating the discrepancy and/or telling the user where the correct location is for the particular package. In some embodiments, the device component 114 itself determines this information without the need to transmit the information to the control system 100 for processing. In some embodiments, other notifications may be provided additionally or alternatively, such as a visual notification within a display screen on the device component and/or a notification that causes vibration of the device component 114.

In certain embodiments, the camera 116 may be utilized as a verification mechanism for ensuring that the projector 118 is working properly and/or is displaying readable projections. For example, the device component 114 may stream in near-real-time information captured via the camera 116 to the control system 100. If no projections are captured, this may trigger an alert (e.g., to a supervisor mobile device), which indicates that the projections are not being made. Likewise, if a projection is not verified (e.g., because there is a lot of light reducing projection image boundaries), a notification can be made in a similar manner as described above. The speaker 117 may be utilized in conjunction therewith, so as to provide audible commands to the user (e.g., delivered from the control system 100 to the component 114 via the antenna 115) should a deviation occur and/or to enable the user of the user device to communicate, via the network, with the control system in a near real-time or real-time manner. For example, in some embodiments, the speaker 117 alternatively or additionally includes a microphone that picks up sound variations that are stored in the memory. The sound variations may correspond to a command or natural language phrase issued by the user, such as "where do I find item X?" or "where is shelf Y located?" Responsively, these sound variations are transmitted, via the antenna 115, to the control system 100. In these embodiments, the control system 100 may employ one or more voice recognition algorithms to interpret the sound variations and provide one or more responsive notifications back to the device component 114, such that the speaker 117 provides the notification output. For example, in response to the user question of "where do I find item X?" the control system 100 may interpret the phrase, identify a data structure that associates the location with item X. The control system 100 may then responsively transmit to the device component 114 a notification that causes the speaker 117 to output the location of where item X is.

Returning back to FIG. 3, the signals provided to and received from the transmitter 304 and the receiver 306, respectively, may include signaling information in accordance with air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the control system 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth™ Smart, USB, and/or the like. Similarly, the user device 110 may operate in accordance with multiple wired communication standards and protocols, such as those described above with regard to the control system 100 via a network interface 320.

Via these communication standards and protocols, the user device 110 can communicate with various other entities (e.g., the control system 100, a location device 415, or the like) using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (e.g., including executable instructions, applications, program modules), and operating system; this may occur periodically, upon initiation via a user of the user device 110, or upon cue(s) received at the user device from the control system 100.

According to one embodiment, the user device 110 may also include a location and/or perspective determining aspect, device, module, functionality, and/or similar words used herein interchangeably. For example, the user device 110 may include outdoor and/or environmental positioning aspects, such as a location module adapted to acquire, for example, latitude, longitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information may be determined by triangulating the user device 110's position in connection with a variety of other systems, including cellular towers, Wi-Fi access points, and/or the like. Similarly, the user device 110 may include indoor positioning aspects, such as a location/environment module adapted to acquire, for example, latitude, longitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), nearby components with known relative locations, and/or the like. For instance, such technologies may include the iBeacons, Gimbal proximity beacons, Bluetooth Low Energy (BLE) transmitters, Near Field Communication (NFC) transmitters, three-dimensional scanners, robot vision systems, environmental mapping devices, and/or the like. These indoor positioning aspects can be used in a variety of settings to determine the location of someone or something to within inches or centimeters.

The user device 110 may also detect markers and/or target objects. For example, the user device 110 may include readers, scanners, cameras, sensors, and/or the like for detecting when a marker and/or target object and/or a pattern of unique colors within its point-of-view (POV)/field-of-view (FOV) of the real world environment/area. For example, readers, scanners, cameras, sensors, and/or the like may include RFID readers/interrogators to read RFID tags, scanners and cameras to capture visual patterns and/or codes (e.g., text, barcodes, character strings, Aztec Codes, MaxiCodes, information/data Matrices, QR Codes, electronic representations, and/or the like), and sensors to detect beacon signals transmitted from target objects or the environment/area in which target objects are located. For example, in some embodiments, the user device 110 may detect signals transmitted from the control system 100 (FIGS. 1-2), an asset 10 (FIG. 8), an improved conveyor belt assembly (FIG. 12), and/or from a location device 415 (FIG. 1), as may be desirable or advantageous.

In one embodiment, the user device 110 may include accelerometer circuitry for detecting movement, pitch, bearing, orientation, and the like of the user device 110. This information/data may be used to determine which area of the augmented/mixed environment/area corresponds to the orientation/bearing of the user device 110 (e.g., x, y, and z axes), so that the corresponding environment/area of the augmented/mixed environment/area may be displayed via the display along with a displayed image. For example, the user device 110 may overlay an image in a portion of the user's POV/FOV of the real world environment/area. In these and other embodiments, the user device 110 may also include circuitry and/or software for determining when a change in the handling of a package or asset by a user of the user device has occurred. Exemplary changes detected may include the picking up of an asset or package, the setting down of an asset or package, or the like.

The user device 110 may also comprise or be associated with an asset indicia reader, device, module, functionality, and/or similar words used herein interchangeably. For example, the user device 110 may include a camera or RFID tag reader configured to receive information from passive RFID tags and/or from active RFID tags associated with an asset 10. The user device 110 may additionally or alternatively include an optical reader configured for receiving information printed on an asset 10. For example, the optical reader may be configured to receive information stored as a bar code, QR code, or other machine-readable code. The optical reader may be integral to the user device 110 and/or may be an external peripheral device in electronic communication with the user device 110. The optical reader may also or alternatively be configured to receive information stored as human readable text, such as characters, character strings, symbols, and/or the like. The user device 110 may utilize the asset indicia reader to receive information regarding an asset 10 to be sorted.

In at least one embodiment, the user device 110 may be equipped with an optical reader or the like configured to receive and/or monitor information associated with an associated conveyor belt, as detailed elsewhere herein. For example, the optical reader may be configured to receive and/or otherwise monitor and/or recognize a pattern located on the conveyor belt and associated with respective assets or packages. Additional details in this respect may be understood with reference to U.S. Ser. No. 15/581,609, the contents of which as are incorporated by reference herein in their entirety The user device 110 may also comprise a user interface (that can include a display or see-through display 314 coupled to a processing element 308 and/or a user input device 318 coupled to a processing element 308). For example, the user interface may be a user application, browser, user interface, and/or similar words used herein interchangeably executing on and/or accessible via the user device 110 to interact with and/or cause display of information, as described herein. The user interface can comprise any of a number of devices allowing the user device 110 to receive data, such as a keypad (hard or soft), a touch display, voice or motion interfaces, or other input device. In embodiments including a keypad, the keypad can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the control system 100 (FIG. 2), location device 415 (FIG. 1), and/or various other computing entities.

In another embodiment, the user device 110 may include one or more components or functionality that are the same or similar to those of the control system 100, as described in greater detail above. As will be recognized, these architectures and descriptions are provided for exemplary purposes only and are not limiting to the various embodiments.

In the embodiment shown in FIGS. 4 and 5, an information gathering device may be provided via a combination of the image camera 116 that is mounted on the device component 114 and/or the three-dimensional depth sensors 119. In other embodiments, the information gathering device may be a three-dimensional depth sensor, a stereo camera, and/or the like—utilized independently relative to the camera. In all of these and additional embodiments, the displayed or captured image data (e.g., FIGS. 8-11 described elsewhere herein) is merged with objects in the physical world/environment in a seamless manner, so as to provide a sense that the displayed image(s) or projection is an extension of the reality present in the physical world/environment. This is oftentimes referred to as a "mixed reality" or a "hybrid reality" environment, whereby the merging of real and virtual worlds produces a new environment containing visualizations of both physical and digital objects that are able to co-exist and interact relative to one another in a real-time manner. Stated otherwise, provided and/or generated is an overlay of synthetic content on the real world or physical environment, with the former being anchored to and able to in a real-time manner (e.g., upon movement of a user) interact with the real world or physical environment.

In the exemplary embodiment of FIGS. 4 and 5, the overlay provided via the user device 110 and its physical component 114 is at least a two dimensional representation that is projected ahead of or before the user of the user device, so as to provide handling/movement guidance (i.e., navigational guidance) for the user during transport of or travel to initiate transport of an asset or package.

C. Exemplary Conveyor Belt Assembly

FIG. 12 depicts a conveyor belt assembly 800 in communication with the control system 100, where the improved conveyor belt assembly facilitates obtaining of asset 10 information. In the embodiment depicted in FIG. 12, the conveyor belt assembly 800 may comprise a conveying mechanism 802 and an acquisition/display entity 804 (for capturing the asset 10 information), each of which as are described in further detail in U.S. Ser. No. 15/581,609, the contents of which as are incorporated by reference herein in their entirety.

Of note relative to FIG. 12, in conjunction with the hands-free user device(s) 110 described elsewhere herein, a user 5 may be guided toward a particular asset or package on the conveying mechanism 802 via one or more navigational projections 810. In at least the illustrated embodiment, the projections 810 are provided in a three-dimensional form, as may be compared with the two-dimensional projections in FIGS. 8-11C. Either may be utilized interchangeably, as may be holographic-based projections or the like. Again, as mentioned, additional detail in this respect may be obtained from U.S. Ser. No. 15/581,609, the contents of which as are incorporated by reference herein in their entirety. In various embodiments, a hologram or holographic-based projection is a recording of a light field, as opposed to an image formed by a lens (e.g., of a pair of smart glasses), and is used to display a fully three or more dimensional image without the use or aid of special glasses or other intermediate objects. A hologram can be displayed within any physical geographical environment without the need of any projecting medium (e.g., projector screen, object, lens). In some embodiments, the navigation projection 810 is or includes a multidimensional image that represents a volumetric display, which is a visual representation of an object in at least three physical dimensions, as opposed to simulating depth or multiple dimensions through visual effects. In these embodiments, the same projected object (e.g., an arrow pointing to an asset over a conveyor) looks different from various perspectives (e.g., a side view, versus a front view, versus a back view). For example, a first front view can include a first arrow and first instructions for worker X to pick/sort from. From a second rear view, the same first arrow can include second instructions for worker Y to pick/sort from, etc.

D. Exemplary Location Device

In various embodiments, one or more locations 400 (and/or 1400) may be associated with one or more (optionally provided) location devices 415, with both being configured for identifying one or more assets 10 being sorted to each location 400. As non-limiting examples, such locations 400 may include one or more vehicles (e.g., aircraft, tractor-trailer, cargo container, local delivery vehicles, and/or the like), pallets, identified areas within a building, bins, chutes, conveyor belts, shelves, and/or the like. The locations may be sort locations (for transport of the asset for additional movement/handling) or pick locations (for storing of the asset until it needs to be picked or "pulled" for order fulfillment purposes of the like). The one or more location devices 415 (e.g., 415-1 of FIG. 13E) may be attached to a location 400 and/or located more generally within and/or at the location 1400 (see FIGS. 13A-13F). Alternatively the one or more location devices 415 may be located adjacent to a sort location 400/1400 or otherwise proximate the sort location 400/1400. In various embodiments, a location device 415 may be located proximate to an area designated to store the sort location 400/1400. For example, when the sort location 400 includes a delivery vehicle, a location device 415 may be located above each of a plurality of parking areas designated for one or more delivery vehicles. This may apply equally relative to sort and/or pick locations (e.g., FIGS. 13D-F).

In various embodiments, the one or more location devices 415 may include components functionally similar to the control system 100 and/or the user device 110. As noted above in referencing the control system 100, the term "computing entity" may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein Like the user device shown schematically in FIG. 3, the location device 415 can include an antenna, a transmitter (e.g., radio), a receiver (e.g., radio), and a processing element (e.g., CPLDs, microprocessors, multi-core processors, co-processing entities, ASIPs, microcontrollers, and/or controllers) that provides signals to and receives signals from the transmitter and receiver, respectively.

The signals provided to and received from the transmitter and the receiver, respectively, may include signaling information in accordance with air interface standards of applicable wireless systems. In this regard, the location device 415 may be capable of operating with one or more air interface standards, communication protocols, modulation types, and access types. More particularly, the location device 415 may operate in accordance with any of a number of wireless communication standards and protocols, such as those described above with regard to the control system 100. In a particular embodiment, the location device 415 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth™, USB, and/or the like. Similarly, the location device 415 may operate in accordance with multiple wired communication standards and protocols, such as those described above with regard to the control system 100 via a network interface.

Via these communication standards and protocols, the location device 415 can communicate with various other entities (e.g., the user device 110 and/or the control system 100) using concepts such as USSD, SMS, MMS, DTMF, and/or SIM dialer. The location device 415 can also download changes, add-ons, and updates, for instance, to its firmware, software (e.g., including executable instructions, applications, program modules), and operating system. Of course, it should also be understood, as mentioned previously herein, that certain embodiments utilizing the hands-free form of the user device 110 may not utilize any location devices 415, whereby location of the various assets (for sorting or picking) may be communicated directly as between the user device 110 and the control system 100, further in conjunction with an environmental mapping capability of the user device 110, as described further below.

E. Exemplary Location

Referring to FIGS. 11A-C and 13D-E, an exemplary location 400 (and/or 1400) is schematically depicted. As described above, the location 400 may include may include one or more vehicles (e.g., aircraft, tractor-trailer, cargo container, local delivery vehicles, and/or the like), pallets, identified areas within a building, bins, chutes, conveyor belts, shelves, and/or the like. In the embodiment depicted in the figures listed above, the location 400 includes a plurality of shelves onto which the assets 10 may be placed and/or removed from. While these figures depict a specific quantity of shelves as being stacked in a vertical direction, it should be understood that any quantity of shelves may be arranged in any suitable configuration to hold the assets 10. Each of the shelves may include one or more visual indicators (e.g., 715 FIG. 10) positioned on or proximate to the shelves; however, as mentioned previously herein, certain hands-free user device embodiments may dispense with such indicators 110c.

In these and other embodiments, navigational projections 715, much like the navigational projections 810 provided in conjunction with the conveyor belt assembly 800 may assist in identifying an appropriate position for placement and/or removal of the asset 10 within the sort and/or pick location. In particular embodiments, for example, a user 5 (FIG. 12) may utilize the indicia reader or camera of the user device 110 to scan, read, or otherwise receive asset identifier data from the asset 10 to identify, in cooperation with the control system 100, an appropriate position for placement of the asset 10 within the warehouse or facility, namely at the location 400/1400. In other embodiments, the control system 100 may determine the appropriate position for placement of the asset within the warehouse relative to the location 400/1400 and convey that information to the user device 110 in response to the user device having approached an asset or package (e.g., for sorting). In other embodiments, the control system 100 may proactively transmit projections to the user device 110 upon receipt of a package or asset order, requiring "picking" of the asset or package from a pick location for order fulfillment purposes or the like. Still further, the control system 100 may determine the appropriate position for placement of the asset 10 within the location 400/1400 based on a variety of factors. For example and without limitation, the control system 100 may determine the appropriate position for placement of the asset 10 within the location 400 based on the destination of the assets 10.

IV. EXEMPLARY CONTROL SYSTEM CONFIGURATION

In various embodiments, the control system 100 may comprise a plurality of modules, each module configured to perform at least a portion of the functions associated with the methods described herein. For example, the control system 100 may comprise an acquisition module, a location module, and a notification module. Although described herein as being individual components of the control system 100, the various modules may operate on a combination of one or more devices (e.g., the user device 110, the acquisition/display entity 804 (for capturing the asset 10 information), the location device 415 (where provided), and/or the control system 100), such that each device performs the functions of one or more modules.

A. Acquisition Module

In various embodiments, the acquisition module may be configured to obtain asset identifier data associated with an asset 10 to be sorted and/or picked. This asset identifier data may be obtained, in part, via an order placed by a customer desiring transport and delivery (e.g., picking, as a first step) of the asset or package. In other embodiments, the asset identifier data may be obtained, in part, via the acquisition/display entity 804 associated with a conveyor belt of the like, transporting packages or assets to a sort location.

In various embodiments, the asset identifier data may comprise a unique asset identifier such as a tracking number or code, and data defining the one or more appropriate locations 400 for the asset 10 as it moves between an origin and a destination, and/or the like.

As a non-limiting example, the acquisition module may be configured to obtain data from the user device 110 (e.g., of FIGS. 3 and 4) and/or the acquisition device 810 (e.g., of FIG. 12). In various embodiments, the data received from the user device 110 and/or the acquisition device 810 may include the entirety of the asset identifier data and therefore the acquisition module need only receive asset identifier data from one of the user device 110 and/or the acquisition device 810. However, in various embodiments, the data received from the user device 110 (FIGS. 3 and 4) and/or the acquisition device 810 (FIG. 12) may comprise only a portion of the asset identifier data, and the acquisition module may be configured to obtain the remainder of the asset identifier data from one or more other sources. As another non-limiting example, the acquisition module may be configured to search one or more databases in communication with the control system 100 for asset identifier data corresponding to the data received from the user device 110 and/or the acquisition device 810. The acquisition module may additionally or alternatively be configured to receive and store at least a portion of the asset identifier data corresponding to the asset 10 that is stored in one or more databases.

In various embodiments, the acquisition module may be configured to transmit at least a portion of the asset identifier data to one or more devices (e.g., the user device 110) and/or one or more modules (e.g., the location module and/or the notification module). Moreover, upon receiving the asset identifier data regarding an asset 10 to be sorted, the acquisition module may be configured to link or otherwise associate the user device 110 and the asset identifier data. As will be described in greater detail herein, the user device 110 may be associated with the asset identifier data by storing at least a portion of the asset identifier data in a memory associated with the user device 110.

B. Location Module

The location module may be configured to receive asset identifier data from the acquisition module. The sort location module is configured to ascertain the appropriate location 400 and/or the appropriate position within the location 400 for the asset 10 based at least in part on the asset identifier data. In certain embodiments, the location module may be configured to determine the appropriate location 400 based at least in part on the asset identifier data and location data that is associated with the each of the plurality of locations 400. The location data may be generated based not only upon the asset identifier data, but also upon the environmental mapping conducted via the user device, as described elsewhere herein.

In various embodiments, each of the plurality of locations 400 may be identified by location data, which may include a unique location identifier. The unique location identifier may comprise a unique character string individually identifying each of the plurality of locations 400. In various embodiments, the location data may define any subsequent processing to be performed on assets 10 within each location 400 and/or 1400, and may comprise the unique sort location identifier for each of the plurality of locations 400/1400 the assets 10 will pass through. In various embodiments, the location module may determine whether the processing to be performed on assets 10 in each of the plurality of locations 400 (as defined in the location data) will move the asset 10 closer to its final destination.

In various embodiments, the location module may determine whether the processing steps to be performed on the assets 10 in each of the locations 400/1400 complies with the service level (e.g., Same Day shipping, Next Day Air, Second Day Air, 3 Day Select, Ground shipping, and/or the like) corresponding to the asset 10. As a non-limiting example, the location module may determine the appropriate location for an asset 10 to be delivered to 123 Main Street, Atlanta, Ga. is a delivery vehicle that will deliver other assets 10 to the same address or nearby addresses (e.g., along the same delivery route). As a second non-limiting example, the location module may determine the appropriate location for an asset 10 to be delivered to 345 Broad Street, Los Angeles, Calif. via Next Day Delivery is a pallet to be loaded onto a plane destined for Los Angeles, Calif. As yet another non-limiting example, the location module may determine the appropriate location for an asset 10 prior to its fulfilment for delivery, which location may be characterized—as done elsewhere herein—as a pick location for the asset.

After determining the appropriate location 400/1400 and/or the appropriate position for the asset 10 within the location 400/1400, the location module may be configured to transmit data defining the appropriate location 400/1400 and/or the appropriate position for the asset 10 within the location 400/1400 to one or more devices (e.g., the user device 110) and/or modules (e.g., the notification module). Additional details in this respect are provided in U.S. Ser. No. 15/390,109, the contents of which as are hereby incorporated by reference in their entirety.

C. Notification Module

In various embodiments, the notification module may receive data indicating whether the location 400 and/or 1400 (e.g., as transmitted to the control system 100 via the user device) is the appropriate sort or pick location (e.g., as determined by the control system 100) for the asset or package being handled. As described herein, the notification module may cause one or more alerts to be generated in order to notify the user 5 (e.g., sort or pick personnel, more generally the carrier personnel) whether the asset 10 should be deposited in the location 400 and/or picked therefrom, however as the case may be. For example, the notification module may be configured to transmit confirmation data and/or mistake data to the user device 110 in order to cause the device to generate an alert discernible by the user 5 (e.g., carrier personnel) indicative of the appropriate sort location for the asset 10. To ascertain whether confirmation data and/or mistake data is appropriate for transmission, the user device 110 (and/or sensors associated therewith, e.g., three-dimensional sensors) may be configured to determine not only the position of the asset but also the position of the user's hands (e.g., including not only location, but also gestures), so as to gauge whether or not sorting and/or picking of the asset is proceeding properly. For example, the camera 116 may utilize object recognition algorithms that identify whenever a person is clasping an object in a particular manner to determine properness.

In various embodiments, the notification module may cause the user device 110 to audibly provide the user with a confirmation message (e.g., via the speaker 117) upon a determination that the location 400/1400 is the appropriate sort or pick location. In various embodiments, the notification module may alternatively or additionally cause one or more sounds to be generated, one or more lights to illuminate, one or more mechanical assemblies to move, and/or other processes discernible by a user 5 to operate and thus indicate to the user 5 whether the location 400/1400 is the appropriate location. It should also be understood that notifications may be generated—and communicated to the user via the user device—not only when the user is at the location (e.g., for picking or sorting), but also during travel of the user to/from the location relative to other locations in the warehouse or facility. As a non-limiting example, with reference to FIG. 9, as the user travels down the hallway or open path, were the user to navigate contrary to the navigational projection 710 provided, the user device could generate an audible (or other type) notification to the user—either independently, or upon cue received via the control system 100. In certain embodiments, notifications may be generated and communicated (e.g., via the network or otherwise) to one or more parties other than the user of the user device (e.g., carrier supervisory personnel, other internal carrier personnel (e.g., quality assurance representatives, or the like), external personnel, external third party entities, or the like). Any of the notifications and/or communications described herein may be so communicated, whether to the user alone and/or to parties other than the user and/or to a combination of both, as may be desirable.

Moreover, the notification module may be configured to generate an alert after associating asset identifier data with location data and/or cueing an asset or package for picking. The notification module may be configured to generate an alert to inform the user 5 (e.g., carrier personnel) or other users regarding asset identifier data being associated with location data and/or the immediate need for navigation or travel to occur toward the location for picking of the asset or package or otherwise.

According to various embodiments, whether adjacent a location 400/1400 or a conveying mechanism 802, the notification module may be configured to generate one or more navigational projections (e.g., 710, 715, 1401 and/or the like, with reference to FIGS. 8-11C by way of non-limiting example) to convey navigational instructions to the user 5. It should be understood that according to various embodiments, the navigational projections may be computer-generated and/or overlaid over an augmented reality environment, which may in certain embodiments be displayed to the user via the utilized user devices 110. In at least the hands-free embodiment, the navigational projections may be generated via the pivoting laser projector (e.g., 118 of FIG. 5) of the user device 110. FIGS. 8-11C and also FIGS. 13A-13F illustrate various types of navigational projections as may be generated via the notification module, when conveyed via the control system 100 further to the user device 110. In at least one embodiment, it may be understood that the navigational projections may be generated at/by the user device 110, independent of the control system 100, upon receipt from the control system of only a new "pick" or "sort" command for a particular asset or package. In various embodiments, the text indicia and navigational projections of FIGS. 13A-13F occur via one or more components of the device component 114 (e.g., laser projector 118 to project the arrow 1303 and the indicia 1309 of FIG. 13A).

Figure 13A:
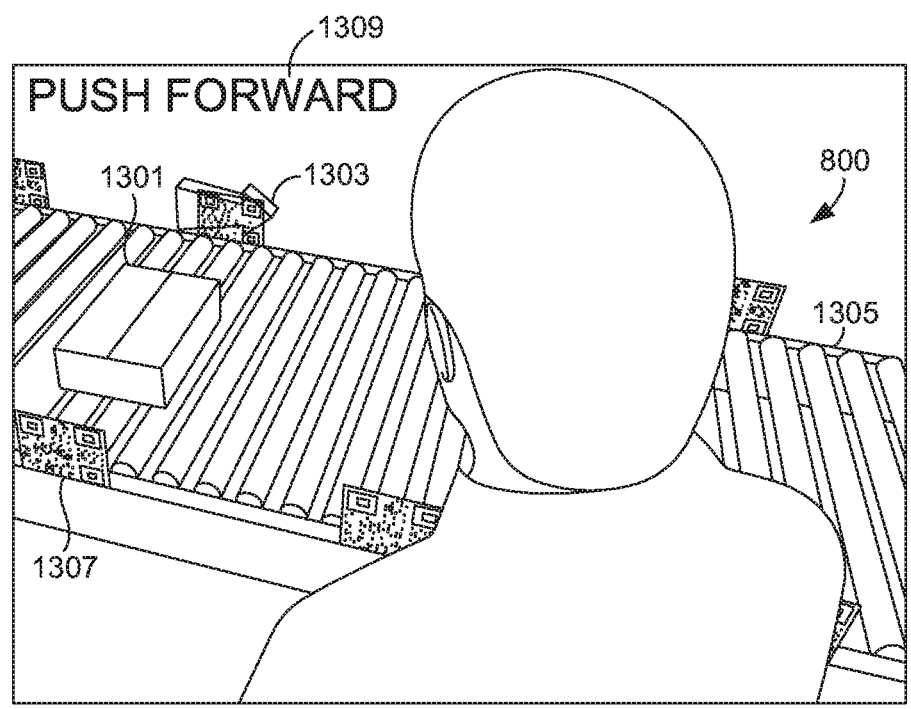
Figure 13B:
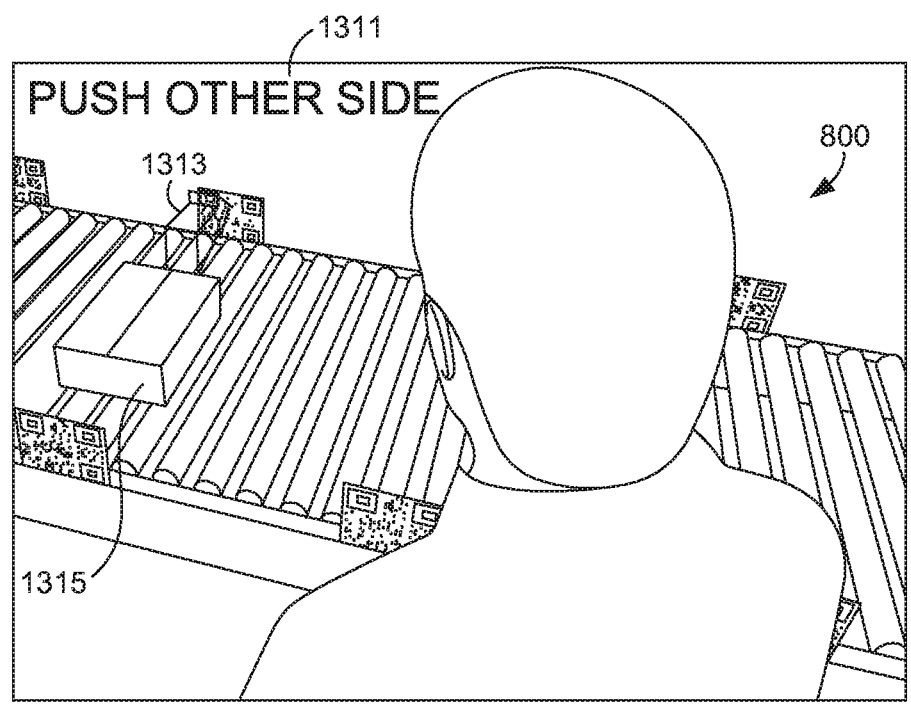
Figure 13C:
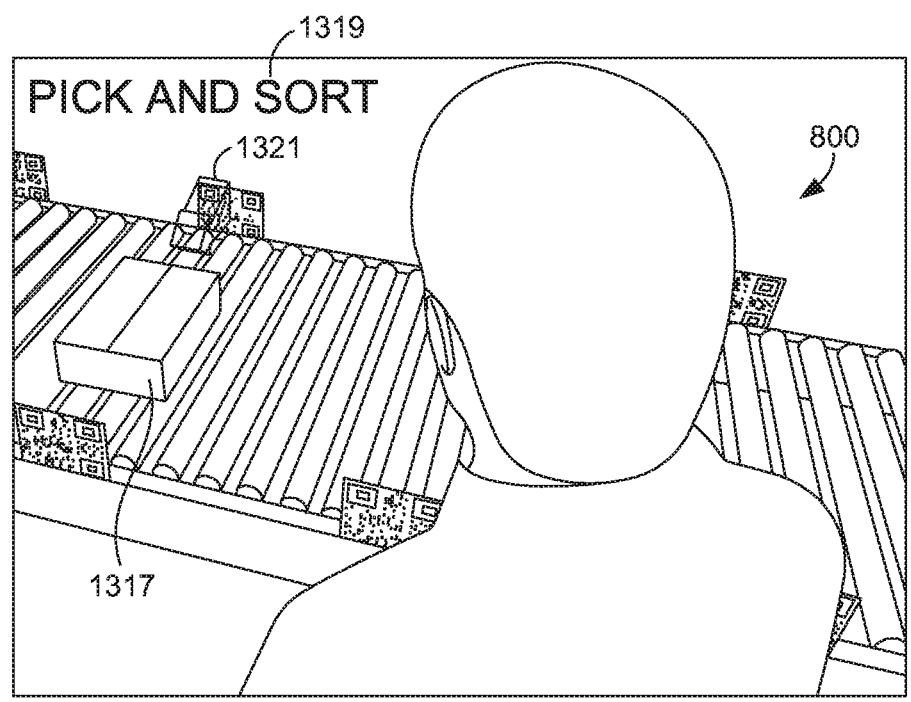

FIG. 13A includes the environment 800 that the user is physically located in, which includes the conveyance device 1305, an asset 1301, various location devices, one of which is indicated by the device 1307. As described above, the location devices help map the environment 800. The text indicia (which may also be considered a navigational projection) 1309 may be projected within the environment 800, which commands the user to "push forward" the asset 1301. The navigational projection 1303 (i.e., the arrow) also assists or illustrates the direction in which the user should push the asset 1301 forward on the conveyance mechanism 1305. FIG. 13B includes the same environment 800, except a different asset 1315 arrives and the text indicia 1311 commands the user to "push" the asset 1315 to the "other side." The navigation projection 1313 helps guide the user to show which direction to push the asset 1315. In this way, these visual frames together help guide and instruct the user for handling of assets. Turning to FIG. 13C, another asset 1317 arrives and the text indicia 1319 prompts the user to "pick and sort" the asset 1317 to pick up, sort, and place within a sorting location.

Figure 13D:
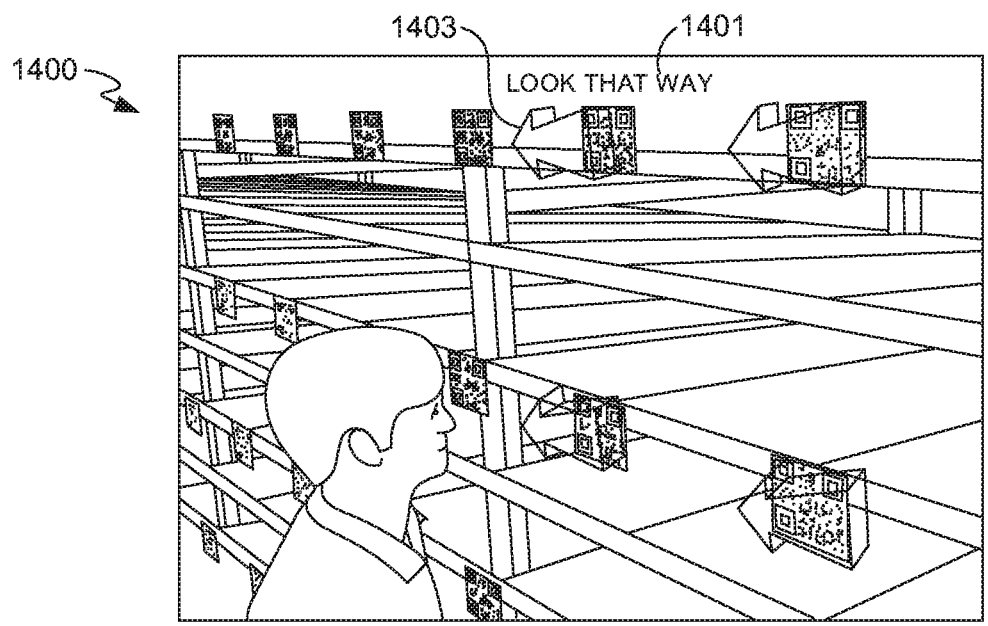
Figure 13E:
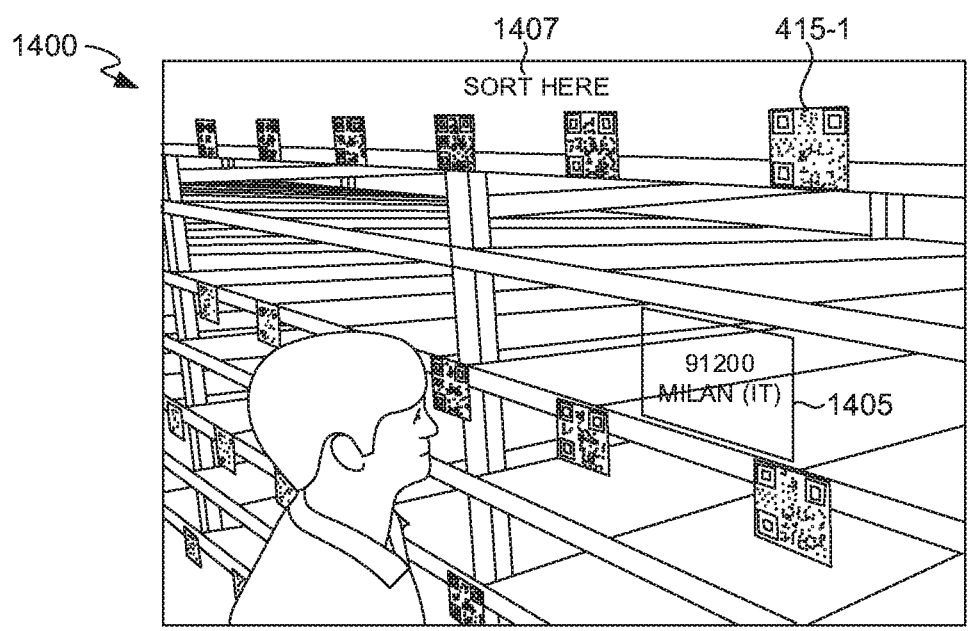
Figure 13F:
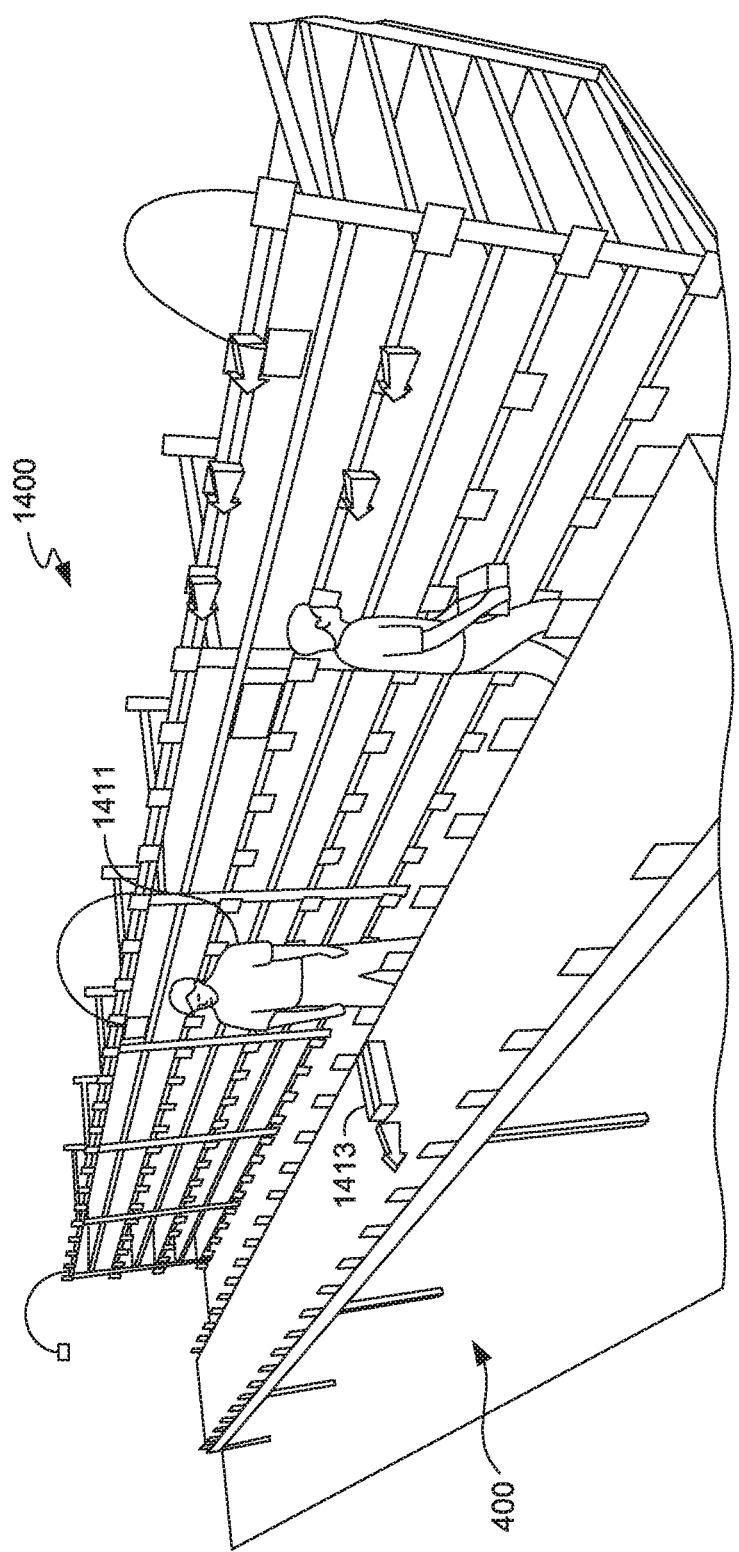

FIG. 13D illustrates prompting the user to sort the asset in a particular location within the environment 1400. In some embodiments, the instructions illustrated in FIG. 13D occur in response to the user picking up the asset 1317 as illustrated in FIG. 13C. The environment 1400 includes the text indicia 1401 that states "look that way," which is accompanied by the navigational projection 1403 that illustrates what direction the user should walk in in order to sort the asset. FIG. 13E illustrates the correct location to sort an asset within the environment 1400. In some embodiments, the instructions illustrated in FIG. 13E occur in response to the user moving responsive to the text indicia 1401 and/or the navigational projection 1403 of FIG. 13D. The environment 1400 includes the text indicia 1407 "sort here" indicating, along with the navigation projection 1405, where the correct cell or location for sorting the asset is. FIG. 13F illustrates the combined environments 800 and 1400 of FIGS. 13A through 13E. Accordingly, the user 1411 picks up the asset 1413 responsive to viewing a first set of navigational projections and/or text indicia and places the asset 1413 within the correct location responsive to viewing a second set of navigational projections and/or text indicia.

V. EXEMPLARY SYSTEM OPERATION

A. Exemplary User Device Operation

FIGS. 8-13F illustrate an exemplary environment in which assets 10 are moved amongst various locations 400, which locations may be pick locations (e.g., for storage of an asset in a warehouse or the like; e.g., FIGS. 8-11C in particular), a conveyor belt location (e.g., FIG. 12 in particular), and/or sort locations (e.g., for placement of an asset following distribution from a pick location to a conveyor belt location; e.g., FIGS. 13A-F in particular). In various embodiments, a user 5 (e.g., sort personnel) may utilize a user device 110 as described herein while transporting assets 10. As described herein, the user device 110 may be configured for receiving information regarding a particular asset 10 to be transported, whether from the control system 100 or otherwise, for guiding the user 5 to a location in which the asset 10 is or should be transported to, and for informing the user 5 whether the asset 10 is being located (e.g., via navigational projections) and/or transported appropriately.

FIG. 6 illustrates exemplary steps carried out by the user device 110 according to various embodiments of the present disclosure to achieve the advantages and capabilities outlined above. In Block 501, an initialization or calibration of the user device 110 may be conducted according to various embodiments. In certain embodiments this step or block may be optional; in other embodiments, it need only be conducted periodically, for example upon initial use of the user device and/or upon receipt—from the control system 100—of a notification that an environment in which the user device operates has been altered or updated. As described herein above, per block 501 an environment that a user is located in is mapped based at least in part on generating a multidimensional (e.g., 3-D) graphical representation of the environment.

According to various embodiments, with reference to FIG. 6 and FIG. 8, during Block 501 of FIG. 6, the user device 110 may be worn by a user 5 so as to map an environment 700 in which the user device 110 is to be used. A graphical representation 701 of the environment may be generated and/or stored via the user device 110; whereby storing may occur locally at the user device and/or be stored at and/or synced with the control system 100, for example, upon completion of the mapping procedure. As may be understood from FIG. 8 and in some embodiments, the mapping procedure of step or Block 501 involves the user, while wearing the user device 110, to move through the environment 700, which movement necessarily involves passage of locations 400/1400 (e.g., shelves) and various assets or packages 10. During the mapping procedure, three-dimensional depth sensors 119 (e.g., the depth sensors 119 of FIG. 5) of the user device may be utilized to capture the data required to generate the graphical representation 701. In conjunction a camera (e.g., the camera 116 of FIG. 5), locations of shelving (e.g., locations 400) and also locations of assets/packages—for example in "pick locations"—may also be established, determined, and/or otherwise saved at or by the user device 110. Movement of the user 5 through the environment 700 defines progressive mapping zones 705, through which the three dimensional depth sensors are configured to scan during the course of mapping. To facilitate and further optimize the mapping procedure, in certain embodiments, one or more commands may be transmitted to the user (e.g., via the speaker 117) from the control system (or otherwise), for example to instruct the user to "turn left" at specific intervals configured to ensure that the entirety of the environment 700 (or a desired portion thereof) is sufficiently mapped. This feature will, for example, minimize and/or eliminate instances of users not covering every area within the environment for which mapping may be desired and/or required. In some embodiments, this mapping using 3D scanning capabilities to detect the immediate environment of the user projections are modified to avoid visual distortion. Accordingly, shapes and images projected are adjusted to the shape of the surface they will be projected upon in particular embodiments. In these embodiments, object recognition devices and/or scanners, such as cameras, located within a device component (e.g., device component 114) can identify the contours of the environment. In response, a projection can be made in the environment based on the shapes (e.g., uneven surfaces) of the environment.

Returning to FIG. 6, in Block (or step) 502, the user device 110 is configured to receive and/or associate product (e.g., package or asset) locations within the mapped environment. This may be via utilization of identifiers 415 (as described elsewhere herein), via transmission of asset location information from the control system to the user device, and/or the like.

According to various embodiments, upon completion of the mapping of the environment 700 and the association of product (e.g., package or asset 10) locations therein, the user device 110 is calibrated for operational mode or use, which use may occur in either (or both) a pick and a sort mode. In the pick mode, the user device is configured to guide a user thereof to a location in which a package or asset 10 may be picked or "pulled" for fulfillment of an order (e.g., within the environment 800 of FIG. 13A); in the sort mode, the user device guides the user (e.g., from a conveyor belt to a sort location), defined to enable further transport and handling of the asset or package in route to a customer or the like (e.g., within the environment 1400 of FIG. 13D).

If it is determined in block 515 that pick mode is appropriate, the user device 110 proceeds to step or Block 503, wherein pick location data is received. In certain embodiments, the pick location data is received—at the user device 110—from the control system 100, for example, upon receipt—at the control system—of a customer order for a particular asset 10 or package. Based upon the received pick location data in Block 503, the user device 110 is configured to, in certain embodiments, generate pick instructions in Block 504. The generation of pick instructions in Block 504 may entail compilation of a route through which the user of the user device 110 must travel—from their present location—so as to reach the location of the asset needing to be picked. Block 504 may further entail generation of a plurality of potential navigational projections (e.g., as described in FIGS. 9-11C) that will be necessary to accurately and efficiently guide or direct the user of the user device to the pick location. In Block 504, in certain embodiments, multiple possible routes may be determined and assessed, with either the user device (automatically) or the user (via an interface selection) choosing an optimal route, for which the navigational projections may thereafter be established. Associated audible commands may also be generated/established, in conjunction with the navigational projections, should it be desirable to—in addition or alternatively to the navigational projections—also audibly guide (e.g., via the speaker 117) the user, instructing them to, for example, "turn left after the next shelving row, as depicted in FIG. 9, by way of non-limiting example.

Upon completion of step or Block 504 the user device 110 is configured to proceed to Block 505, wherein the navigational projections and/or audible instructions are dynamically displayed and/or otherwise provided to the user of the user device, characterized generically as "pick instructions." It should be understood that, according to certain embodiments, Blocks 504 and 505 need not be separate and distinct steps or blocks; instead, as will be described below, as the user moves through the environment 700, the user device 110 may be configured to dynamically generate and display various navigational projections and/or audible instructions. In at least those embodiments, Block 504 may entail merely identifying—at the user device 110—the user's present location, the pick location, and a variety of pathways or routes there-between.

Reference is made now to FIGS. 9-11C, which depict a variety of exemplary navigational projections that may be generated and displayed via the user device 110 as a user 5 wearing the same moves around an environment 700. As may be understood by contrasting FIG. 9 with FIGS. 10-11C, ahead of the user arriving proximate the pick location, various navigational projections 710 may be generated and displayed (e.g., via the pivoting laser projector 118 of FIG. 5). These navigational projections 710 may be two or three-dimensional in nature and—as generally understood—provide directional guidance to the user, as to which direction they should move or turn. As illustrated, by way of non-limiting example, in FIG. 9, the navigational projection 710 in certain embodiments may be a two-dimensional directional arrow configured to instruct a user waring a user device to make a change relative to their present movement pattern. In other embodiments, such as those illustrated in FIGS. 12-13F, the navigational projections, therein described as indicators 810 or navigational projections 810, may be three-dimensional in nature.

Returning now to FIGS. 9-11C, with reference now in particular to FIGS. 10-11C, therein may be seen certain navigational projections 715, 715A, 715B, 715C, which may be generated and displayed for the user—via the worn user-device 110—as they approach the proximity of the pick location. Proximity may be defined as within a specific row upon which the asset or package to be picked is located. As may be understood from FIGS. 11A-11C in particular, the navigational projections 715 may include a frame and/or a checkmark, showing the right location to pick the asset or package from. In certain embodiments, text indicating a quantity may also be illustrated, as in FIG. 11A via projection 715A, which projection encompasses multiple package or asset boundaries, as may be recognized and detected by the user device 110 upon approach to the asset or package. The boundaries may, as a non-limiting example, be determined by the user device 110, at least in part, based upon asset information received from the control system 100. In other embodiments software embedded upon the user device 110, in conjunction with the camera (e.g., the camera 116 of FIG. 5) may be configured to, via an iterative machine learning-type algorithm and/or object recognition algorithm, recognize and determine asset/package dimensions and thus boundaries over a period of time.

FIG. 11A illustrates one exemplary embodiment, in which, as alluded to above, the navigational projection 715A encompasses multiple assets or packages 10 in a particular location 400, with textual instructions also be generated and provided to the user to "pick 2" of the highlighted or framed packages. In other embodiments (not illustrated), the instructions may say "pick these two" assets, with the frame encompassing only two specific assets on the shelf or location 400. In still other embodiments (e.g., FIG. 11C), multiple frames and instructions associated with navigational projection 715C may be provided, distinctly identifying three assets or packages that need to be picked. A single asset pick embodiment is also illustrated in FIG. 11B, whereby a navigational projection 715B is provided, similar to the projection 715C, in that each frame and textual instruction generated and displayed surrounds and is overlaid relative to a single package or asset 10. It should be understood that the illustrations and embodiments of FIGS. 11A-C are non-limiting in nature; additional and/or alternatively configured navigational projections 715 may be envisioned within the scope of the inventive concept described herein.

Returning now to FIG. 6 and remaining with Block 505, in addition to audible guidance instructions that may be provided/generated in conjunction with the navigational projections 710, 715 of FIGS. 10-11C, various embodiments may involve the user device 110 further generating and transmitting to the user 5 audible alerts when deviations occur. For example, the user device 110—via its speaker 117 of FIG. 5—may provide general feedback to the user, such as "you picked the wrong asset; please await further instructions" or "you turned the wrong way; please stand still pending updated navigational projections becoming visible." Alternative or additional "feedback" type alerts and/or instructions may be generated, in a near real time or real time manner, based upon the user's responsiveness (and accuracy of movement) relative to the provided navigational projections.

Turning now to step or Block 506 in FIG. 6, upon the user with the user device 110 reaching the pick location, the user device 110 is configured to further detect asset handling, specifically when the asset or package has been picked up by the user. In certain embodiments, feedback may also be provided at this junction, via the speaker 117 of the user device 110. In these and still other embodiments, the user device 110 may capture an image of the "picking" (e.g., via its camera 116) and/or transmit the same to the control system 100 for centralized/remote verification of picking accuracy and completeness. This action may occur also in conjunction with Block 507, whereby one or more pick-related notifications may be generated and/or transmitted by the user device 110, whether to the user 5 and/or the control system 100.

According to various embodiments, the detection of the "picking" may be conducted by the user device 110 via a collision detection algorithm, as detailed elsewhere herein. As generally understood, though, such algorithm(s) are configured to detect changes in movement relative to the user device 110, whereby if an item or person (e.g., a user) associated with or wearing the user device 110 encounters a collision—for example by picking up and physically touching an asset or package—that "collision" likewise registers at the user device. In this manner, the user device 100 may be programmed to transition from a guidance mode to—at least temporarily—a report or notification mode, so as to convey—for example to the control system 100—that the pick has occurred.

In certain embodiments multiple algorithms may be utilized. One may be to identify what an asset or package is, namely what its physical boundaries entail. Another is to interpret when a user's hands (or the like) collide with and pick up (or set down) the asset or package. Each may be assisted, not only via the depth sensors 119 of the user device, but also the camera 116 thereof. In certain embodiments, at least two and in some instances four depth sensors 119 may be provided, each with a working range between 0.85 and 3.1 meters (alternative ranges may also be provided). Using data collected via the depth sensors, the environment may thus not only be mapped, but changes therein, including collisions between objects—including packages, assets, users, and/or devices such as forklifts operated by a user—may be detected and accounted for. In some embodiments, particular algorithms able to identify the parcel itself using machine learning techniques to search for physical clues (e.g., size, color, scratches, or any feature, even microscopic that may lead to uniquely id the parcel) without needing to read any parcel id label or barcode.

Remaining with FIG. 6 and returning to Block 515, in certain instances the user device 110—whether independently or following a successful pick procedure—may be configured to operate in a sort mode, which corresponds generally to utilization of the user device to move assets or packages to/from various sorting locations within a mapped environment, as contrasted with a user locating the asset or package from a stored "pick" location. The sequence in sort mode initiates with the user device 110, in Block 508, detecting handling of an asset by the user (e.g., via the collision algorithm described previously herein) and/or obtaining asset identifier data from the asset or package (e.g., via the camera 116, whether independently at the user device 110 or further in conjunction with an exchange of certain asset/package data with the control system 100).

Upon obtaining the asset identifier data, the user device 110 is able to determine and/or receive sort location data for the asset or package 10 in Block 509. Based thereon, much like in Blocks 504-505 and 507 (in the context of sorting), the user device 110 is configured to according to various embodiments—generate sort instructions in Block 510, dynamically display sort instructions (e.g., navigational projections, text indicia, and/or audible instructions and the like) in Block 511, and generate/transmit one or more sort-related notifications in Block 512. In some embodiments, the generating and displaying of one or more navigational projections configured to guide the user to an asset location within an environment is based at least on associating one or more asset locations within a mapped environment. In various embodiments, the displaying occurs within an environment that a user is in without regard to a necessary medium (e.g., lens, projector screen, etc.). In these embodiments, the projection is displayed in open space within the environment. It should be understood that any of Blocks 509-512 may be substantially the same or identical (the same) as those in Blocks 503-505 and 507, as previously detailed herein; in certain embodiments, though, one or more of the Blocks may be configured differently for sort versus picking mode.

Additional details relative to the utilization of the user device 110 in sort mode may be understood with reference to FIGS. 13A-F, which figures are also described elsewhere herein. Additional details regarding sorting procedures may also be understood with reference to U.S. Ser. No. 15/390,109, the contents of which as are hereby incorporated by reference in their entirety.

B. Exemplary Control System Operation

FIG. 7 illustrates exemplary steps carried out by the control system 100 according to various embodiments of the present disclosure. As illustrated in FIG. 7, the control system 100 may receive asset identifier data at Block 601. As indicated herein, the asset indicator data may be received from the user device 110, the acquisition device 810, and/or the one or more location devices 415 at a location 400. Further details regarding the scope and contents of the asset identifier data have been described previously herein. Still additional details in this respect may be understood with reference to U.S. Ser. No. 15/390,109, the contents of which as are hereby incorporated by reference in their entirety.

At Block 602, the control system 100 may be configured to determine the appropriate location 400 for the asset 10 and/or the appropriate position within the location for the asset 10. In various embodiments, the determination of the appropriate location for the asset 10 may be based at least in part on the received asset identifier data. Moreover, the control system 100 may utilize location data corresponding to each of the locations 400 to determine whether any subsequent processing to be performed on assets 10 at each location 400 will move the asset 10 closer to its final destination. As a non-limiting example, the control system 100 may determine the appropriate location for an asset 10 to be delivered to 123 Main Street, Atlanta, Ga. is the delivery vehicle that will deliver other assets 10 to 123 Main Street, Atlanta, Ga. Additional details in this respect may be understood with reference to U.S. Ser. No. 15/390,109, the contents of which as are hereby incorporated by reference in their entirety.

Referring again to FIG. 7, at Block 703 the control system 100 may be configured to transmit data identifying the appropriate sort location to the user device 110. As noted herein, the user device 110 may be configured to generate an indicator (e.g., visual indicators or navigational projections 710/715/810) discernible by the user 5 (e.g., carrier personnel) regarding the appropriate pick or sort location for the asset 10. However, as noted herein, each asset 10 may have information indicative of an appropriate location printed thereon, and accordingly the control system 100 may not need to—in those embodiments—transmit appropriate location data to the user device 110.

The control system 100 may also be configured to receive a variety of data—including location data—from the user device 110 at Block 604. At Block 605, the control system 100 may subsequently compare the appropriate location (at which the user for picking or the asset for sorting should be located) and the actual location data received at Block 604 to determine whether the user device 110 is proximate the appropriate location. As indicated at Block 606, the remaining steps to be completed may be selected based at least in part on a determination of whether the location is an appropriate (or desired/accurate) location. Additional details in this respect may be understood with reference to U.S. Ser. No. 15/390,109, the contents of which as are hereby incorporated by reference in their entirety.

Upon a determination that the user device 110 is proximate an incorrect location 400, the control system 100 may generate mistake data at Block 610. Upon generating the mistake data, the control system 100 may transmit the mistake data to the user device 110 at Block 611. As indicated herein, the user device 110 may be configured to generate a message discernible by the user 5 (e.g., carrier personnel) indicating the user device 110 is proximate an incorrect location 400 (e.g., as illustrated in FIG. 13D). In various embodiments, the control system 100 may be configured to associate the asset identifier data with the location data corresponding to the location 400 at Block 612. At Block 613, the user 5 may continue transporting the asset 10 (and consequently the user device 110) to another (ideally correct) location 400. The process may return to Block 601 in such scenarios and repeat the recited steps.

Referring again to Block 606, the process may proceed after comparing the actual/received location data and the appropriate location data for the asset 10 (illustrated as Block 605) with reference to Blocks 607-609 if the user 5 approaches the appropriate location. In the context of sorting procedures, additional details in this respect may be understood with reference to U.S. Ser. No. 15/390,109, the contents of which as are hereby incorporated by reference in their entirety.

The control system 100 may be further configured to generate one or more alerts regarding the association between the asset identifier data and the location data. The control system 100 may be configured to generate an alert to inform the user 5 (e.g., carrier personnel) or other users regarding asset identifier data being associated with location data.

VI. CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer implemented method for providing hands-free handling of at least one asset by a user, the method comprising:
   receiving, from a remote location relative to a user device that is worn by the user, asset identifier data for at least one asset, the user device and the at least one asset being located within a physical environment;
   determining, at the user device, first location data associated with the user device and determining second location data associated with the at least one asset, the second location data being determined, based at least in part, on analyzing the received asset identifier data, the first location data being determined, based at least in part, on analyzing a present position of the user device; and
   based at least in part on the determining the first location data and the second location data, dynamically generating and displaying, directly over a surface within the physical environment, one or more navigational projections, the one or more navigational projections configured to guide the user to a location associated with the second location data, wherein the surface is not a lens medium.

2. The method of claim 1, further comprising detecting, at the user device, handling of the at least one asset by the user in response to the present location of the user device matching the location associated with the at least one asset.

3. The method of claim 2, wherein the asset identifier data is obtained by a controller system upon receipt of an order for the at least one asset by a customer.

4. The method of claim 1, wherein the asset identifier data is received, at the user device, via the user device scanning asset identifying data located on the at least one asset.

5. The method of claim 1, wherein:
   the user device further comprises a plurality of depth sensors and a pivoting laser projector;
   the dynamic generation and display of the one or more navigational projections occurs via the pivoting laser projector; and
   the plurality of depth sensors collect environmental data to determine at least one type of the one or more navigational projections to generate and display.

6. The method of claim 5, wherein one of the at least one type of navigational projections is a two-dimensional directional arrow configured to instruct the user wearing the user device to make a change relative to the user present movement pattern.

7. The method of claim 5, wherein one of the at least one type of navigational projections is a two-dimensional frame identifying one or more assets for the user to pick up upon arriving at the location associated with the at least one asset.

8. The method of claim 7, wherein the two-dimensional frame encompasses multiple assets for picking up by the user.

9. The method of claim 7, wherein the two-dimensional frame encompasses a single asset.

10. The method of claim 7, wherein the two-dimensional frame contains text indicia configured to further guide and instruct the user for handling of the one or more assets.

* * * * *